US012767904B2

(12) United States Patent
Narayanaswamy et al.

(10) Patent No.: US 12,767,904 B2
(45) Date of Patent: Oct. 20, 2026

(54) METHODS AND SYSTEMS FOR CONVERSION OF MIXED PLASTICS TO HIGH VALUE CHEMICALS

(71) Applicant: SABIC Global Technologies B.V., Bergen OP Zoom (NL)

(72) Inventors: Ravichander Narayanaswamy, Bangalore (IN); Alexander Stanislaus, Bangalore (IN); Hatem Belfadhel, Riyadh (SA); Shailesh Singh Bhaisora, Bangalore (IN)

(73) Assignee: SABIC Global Technologies B.V., Bergen Op Zoom (NL)

( * ) Notice: Subject to any disclaimer, the term of this patent is extended or adjusted under 35 U.S.C. 154(b) by 163 days.

(21) Appl. No.: 18/717,092

(22) PCT Filed: Dec. 15, 2022

(86) PCT No.: PCT/IB2022/062309
§ 371 (c)(1),
(2) Date: Jun. 6, 2024

(87) PCT Pub. No.: WO2023/111946
PCT Pub. Date: Jun. 22, 2023

(65) Prior Publication Data

US 2025/0034466 A1 Jan. 30, 2025

Related U.S. Application Data

(60) Provisional application No. 63/265,445, filed on Dec. 15, 2021.

(51) Int. Cl.
*C10G 69/04* (2006.01)
*C08J 11/12* (2006.01)

(52) U.S. Cl.
CPC ............... *C10G 69/04* (2013.01); *C08J 11/12* (2013.01); *C08J 2300/30* (2013.01);
(Continued)

(58) Field of Classification Search
CPC ............ C10G 69/04; C10G 2300/1003; C10G 2300/4006; C10G 2300/706;
(Continued)

(56) References Cited

U.S. PATENT DOCUMENTS

| | | | |
|---|---|---|---|
| 4,175,211 | A | 11/1979 | Chen et al. |
| 2003/0019789 | A1 | 1/2003 | Kwak |

(Continued)

FOREIGN PATENT DOCUMENTS

| | | | |
|---|---|---|---|
| JP | 2002060757 | A | 2/2002 |
| WO | 2018/069794 | | 4/2018 |

OTHER PUBLICATIONS

International Search Report for international application No. PCT/IB2022/062309, mailed on Mar. 21, 2023.

*Primary Examiner* — Ellen M McAvoy
(74) *Attorney, Agent, or Firm* — Womble Bond Dickinson (US) LLP

(57) ABSTRACT

Provided herein are methods and systems for decontaminating and converting a mixed plastic waste feed to a hydrogen-rich stream suitable for hydrocarbon refinery processing. Methods include the depolymerization of mixed plastic waste, removal of inorganic and metal contaminants, and feeding to one cracking unit or several cracking units in series. The products of the hydrocarbon refinery processing are high value chemicals such as C2-C4 olefins and benzene, toluene, xylenes, and ethyl benzene.

20 Claims, 6 Drawing Sheets

(52) U.S. Cl.
CPC ................ *C10G 2300/1003* (2013.01); *C10G 2300/4006* (2013.01); *C10G 2300/706* (2013.01); *C10G 2300/708* (2013.01); *C10G 2400/20* (2013.01); *C10G 2400/30* (2013.01)

(58) Field of Classification Search
CPC .......... C10G 2300/708; C10G 2400/20; C10G 2400/30; C08J 11/12; C08J 2300/30; Y02W 30/62
See application file for complete search history.

(56) References Cited

U.S. PATENT DOCUMENTS

| | | | | |
|---|---|---|---|---|
| 2016/0362609 | A1 | 12/2016 | Ward | |
| 2019/0177626 | A1* | 6/2019 | Ramamurthy | C10G 69/06 |
| 2019/0284476 | A1* | 9/2019 | Gaber | C10B 53/07 |
| 2021/0332300 | A1 | 10/2021 | Timken | |
| 2023/0212367 | A1* | 7/2023 | DeBruin | C08J 11/06<br>521/47 |
| 2023/0250343 | A1* | 8/2023 | Wang | C10B 53/07<br>585/241 |
| 2024/0010939 | A1* | 1/2024 | Bien | C10G 45/44 |
| 2024/0218257 | A1* | 7/2024 | Schucker | B01J 29/40 |
| 2024/0409829 | A1* | 12/2024 | Gautam | C10G 11/02 |

* cited by examiner

METHODS AND SYSTEMS FOR CONVERSION OF MIXED PLASTICS TO HIGH VALUE CHEMICALS

CROSS-REFERENCE TO RELATED APPLICATIONS

This application is a U.S. National Phase Under 35 U.S.C. § 371 of International Application No. PCT/IB2022/062309, titled “METHODS AND SYSTEMS FOR CONVERSION OF MIXED PLASTICS TO HIGH VALUE CHEMICALS,” filed Dec. 15, 2022, which claims the benefit of and priority to U.S. Provisional Application No. 63/265,445, filed on Dec. 15, 2021, all of which are incorporated herein by reference in their entireties.

TECHNICAL FIELD

The present disclosure generally relates to systems and methods for converting mixed plastic waste (MPW) to high value chemical (HVC) products. More specifically, the present disclosure relates to systems and methods for decontaminating and converting MPW to a hydrogen-rich hydrocarbon product for further processing, either separately or combined with hydrogen-lean hydrocarbon streams, in downstream processing units, such as a fluid catalytic cracking (FCC) unit. The resulting HVC products generally include light gas C2-C4 olefins and aromatics, such as benzene, toluene, xylene, and ethyl benzene (commonly known as BTXEB).

BACKGROUND

Mixed plastic waste is an opportunity feed that is processed by cracking to produce mixed cracked products, such as ethylene, propylene, butenes, pentenes, hexenes, heptenes, octenes, nonenes, decenes, benzene, toluene, xylenes, and ethyl benzenes, including alpha and internal olefins, linear or branched carbon chains, dienes, and trienes. These products can be produced in an FCC unit with the HVC products being harvested from the mixed cracked products. The mixed plastic wastes are hydrogen-rich hydrocarbon feedstocks, which yield high value chemicals and lower coke formation during cracking as compared to hydrogen-lean hydrocarbon refinery feeds. The low value chemicals formed during FCC, like naphtha saturates, can be processed in processing units using steam cracking (SC), hydrocracking (HC), hydrotreating (HT), naphtha hydrotreating (NHDT), or catalytic naphtha reforming downstream of FCC to generate additional high value chemical yields.

The known processes of delivering mixed plastic waste to FCC units have several drawbacks. The delivery of solid materials, such as ground, shredded, chopped, or micronized mass, may exhibit or cause bridging, plugging, or constriction of feed flows to conventional hydrocarbon processing units due to operating temperatures being near or above the melting point of the solid materials. Additionally, the mixed plastic waste feed often contains one or more of halogenated, nitrous, sulfurous, pigmented, filled, and/or reinforced polymers and additives that, upon cracking, can damage the FCC unit and ancillary equipment. Furthermore, the deposition of these materials on the cracking catalyst can lead to more dry gas production and processing issues in the FCC wet gas compressors. A process efficiency perspective favors feeding liquid products that have been preprocessed to minimize non-hydrocarbon content to the FCC unit.

Liquefied molten polymers as FCC feed have the limitation of high viscosity which can interfere with the fluidization of the catalyst during FCC operation. As the efficiency of the catalyst and cracking process is diminished, side reactions can become prevalent, resulting in lower target product yields and increased coke formation. As coke forms, defluidization due to lumping of the coke and catalyst can lead to costly shutdown of the FCC unit. It is presently recognized that the viscosity of the materials to be cracked should be sufficiently low to ensure that the feeds can be sprayed into the catalyst chamber to provide even dispersal and operation of the FCC unit.

SUMMARY

Embodiments include methods of processing a mixed plastic waste feed to produce a high value chemical (HVC) product. One such method includes the steps of introducing a mixed plastic waste feed containing a plurality of plastic polymers to a depolymerization unit, followed by operating the depolymerization unit at a temperature and a residence time sufficient to at least partially depolymerize the plurality of plastic polymers in the mixed plastic waste feed to produce a hydrogen-rich molten oligomers product stream containing inorganic products from the mixed plastic waste feed and a gas stream containing volatile hydrocarbons and heteroatoms. The method further includes the step of supplying the hydrogen-rich molten oligomers product stream and a hydrogen-lean hydrocarbon stream to a hydrocarbon processing unit operated at a temperature ranging from about 400° C. to about 750° C. to produce a HVC product. The hydrogen-lean hydrocarbon stream can be one or more of an atmospheric residue, a vacuum residue, a straight run vacuum gas oil, or a cracked vacuum gas oil. The hydrogen-rich molten oligomers product stream and the hydrogen-lean hydrocarbon stream can be mixed prior to being supplied to the hydrocarbon processing unit.

In certain embodiments, the depolymerization unit is operated at a temperature ranging from about 250° C. to about 500° C., or from about 250° C. to about 400° C. with a residence time of less than 1 hour. In certain embodiments, the hydrogen-rich molten oligomers product stream has a viscosity of less than about 10 centiPoise at a temperature ranging from about 300° C. to about 400° C. In certain embodiments, the average molecular weight of the hydrogen-rich molten oligomers product stream is at least twenty times lower than average molecular weight of the mixed plastic waste feed.

In certain embodiments, the depolymerization unit is a reactor equipped with an extruder, an auger, a screw, a kneader, a disk ring reactor, a kiln, a stirred tank reactor, a wiped film kneader evaporator, a tubular reactor, or combinations thereof. In certain embodiments, the hydrocarbon processing unit is one or more of a fluid catalytic cracking (FCC) unit, a hydrocracking unit, a decoking unit, a catalytic naphtha reforming unit a naphtha hydrotreatment unit, a hydrotreating unit, and a steam cracking unit.

In certain embodiments, the method further includes the step of passing the hydrogen-rich molten oligomers product stream to a melt filtration unit, a slurry settler, or a centrifugation unit to remove a portion of the inorganic products and insoluble components in the hydrogen-rich molten oligomers product stream before supplying the hydrogen-rich molten oligomer product to the hydrocarbon processing unit. In certain embodiments, the method further includes the step of passing the hydrogen-rich molten oligomers product stream to a separation unit to remove a portion of chlorine compounds, nitrogen compounds, and sulfur compounds before supplying the hydrogen-rich molten oligomer product to the hydrocarbon processing unit where the separation unit is a vacuum separation unit.

In certain embodiments, the method further includes the step of collecting the hydrogen-rich molten oligomers product stream in a holding tank to remove heteroatoms present as volatiles in the hydrogen-rich molten oligomers product stream before supplying the hydrogen-rich molten oligomer product to the hydrocarbon processing unit. In certain embodiments, the method further includes the step of passing a stripping gas stream through the hydrogen-rich molten oligomers product stream in the holding tank to further remove heteroatoms present as volatiles in the hydrogen-rich molten oligomers product stream before supplying the hydrogen-rich molten oligomer product to the hydrocarbon processing unit.

Certain embodiments of a method of processing a mixed plastic waste feed to produce a high value chemical (HVC) product include the steps of introducing a mixed plastic waste feed containing a plurality of plastic polymers to a depolymerization unit, followed by operating the depolymerization unit at a temperature and a residence time sufficient to at least partially depolymerize the plurality of plastic polymers in the mixed plastic waste feed to produce a hydrogen-rich molten oligomers product stream containing inorganic products and a gas stream containing volatile hydrocarbons and heteroatoms. The method further includes the step of supplying the hydrogen-rich molten oligomers product stream and a hydrogen stream to a first cracking unit containing a cracking catalyst to produce a first hydrocarbonaceous stream and a first slurry stream, the first cracking unit being a continuous cracking unit and the first slurry stream containing a portion of the cracking catalyst, the inorganic products, and residual hydrocarbons. The method further includes the step of passing the first slurry stream from the first cracking unit to a first separation unit to produce a second slurry stream containing the inorganic products and residual hydrocarbons and a catalyst-rich stream containing the portion of the cracking catalyst and supplying the catalyst-rich stream to the first cracking unit. The method further includes the step of introducing the second slurry stream to a second separation unit to produce a second hydrocarbonaceous stream containing the residual hydrocarbons and an inorganic products-rich stream. The method further includes the steps of delivering the first hydrocarbonaceous stream and the second hydrocarbonaceous stream to a distillation unit to produce a distillate stream and a bottoms stream containing residual hydrocarbons, metals, and residual inorganic products, and processing the bottoms stream in a third separation unit to remove the metals and the residual inorganic products and to produce a recovered hydrocarbon stream. The method further includes the steps of mixing the recovered hydrocarbon stream and the distillate stream to produce a hydrogen-rich liquid hydrocarbon stream, and supplying the hydrogen-rich liquid hydrocarbon stream and a hydrogen-lean hydrocarbon stream to a second cracking unit operated at a temperature ranging from about 400° C. to about 750° C. to produce a HVC product. The hydrogen-lean hydrocarbon stream can be one or more of an atmospheric residue, a vacuum residue, a straight run vacuum gas oil, or a cracked vacuum gas oil. The hydrogen-rich liquid hydrocarbon stream and the hydrogen-lean hydrocarbon stream can be mixed prior being supplied to the second catalytic cracking unit.

In certain embodiments, the method further includes the step of passing the hydrogen-rich molten oligomers product stream to a melt filtration unit to remove a portion of the inorganic products and insoluble components before supplying the hydrogen-rich molten oligomer product to the first cracking unit. In certain embodiments, the method further includes the step of collecting the hydrogen-rich molten oligomers product stream in a holding tank to remove heteroatoms as volatiles before supplying the hydrogen-rich molten oligomer product to the first cracking unit. In certain embodiments, the method further includes the step of passing the hydrogen-rich molten oligomers product stream to a separation unit to remove a portion of chlorine compounds, nitrogen compounds, and sulfur compounds before supplying the hydrogen-rich molten oligomer product to the first cracking unit.

Certain embodiments of a method of processing a mixed plastic waste feed to produce a high value chemical (HVC) product by introducing a mixed plastic waste feed containing a plurality of plastic polymers to a depolymerization unit, and operating the depolymerization unit at a temperature and a residence time sufficient to at least partially depolymerize the plurality of plastic polymers in the mixed plastic waste feed to produce a hydrogen-rich molten oligomers product stream containing inorganic products from the mixed plastic waste feed and a gas stream containing volatile hydrocarbons and heteroatoms. The depolymerization unit can be operated at a temperature ranging from about 250° C. to about 500° C. and the residence time of less than 1 hour. The method further includes the steps of supplying the hydrogen-rich molten oligomers product stream and a hydrogen stream to a thermal hydrotreating unit to produce a first hydrocarbonaceous stream and a slurry stream containing the inorganic products and residual hydrocarbons, and passing the first slurry stream from the thermal hydrotreating unit to a first separation unit to produce an inorganic products-rich stream and a second hydrocarbonaceous stream containing the residual hydrocarbons. The method further includes the steps of delivering the first hydrocarbonaceous stream and the second hydrocarbonaceous stream to a distillation unit to produce a distillate stream and a bottoms stream containing residual hydrocarbons, metals, and residual inorganic products, and processing the bottoms stream in a second separation unit to remove the metals and the residual inorganic products and to produce a recovered hydrocarbon stream. The method further includes the steps of mixing the recovered hydrocarbon stream and the distillate stream to produce a hydrogen-rich liquid hydrocarbon stream and supplying the hydrogen-rich liquid hydrocarbon stream and a hydrogen-lean hydrocarbon stream to a fluid catalytic cracking unit operated at a temperature ranging from about 400° C. to about 750° C. to produce a HVC product. The hydrogen-lean hydrocarbon stream can be one or more of an atmospheric residue, a vacuum residue, a straight run vacuum gas oil, or a cracked vacuum gas oil. The hydrogen-rich liquid hydrocarbon stream and the hydrogen-lean hydrocarbon stream can be mixed or supplied separately prior to being supplied to the fluid catalytic cracking unit.

In certain embodiments, the method further includes the step of passing the hydrogen-rich molten oligomers product stream to a melt filtration unit to remove a portion of the inorganic products and insoluble components before supplying the hydrogen-rich molten oligomer product to the thermal hydrotreating unit. In certain embodiments, the method further includes the step of collecting the hydrogen-rich molten oligomers product stream in a holding tank to remove heteroatoms present as volatiles in the hydrogen-rich molten oligomers product stream before supplying the hydrogen-rich molten oligomer product to the thermal hydrotreating unit. In certain embodiments, the method further includes the step of passing a stripping gas stream through the hydrogen-rich molten oligomers product stream in the holding tank to remove heteroatoms present as volatiles in the hydrogen-rich molten oligomers product stream before supplying the hydrogen-rich molten oligomer product to the thermal hydrotreating unit.

Aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

Figure 1:
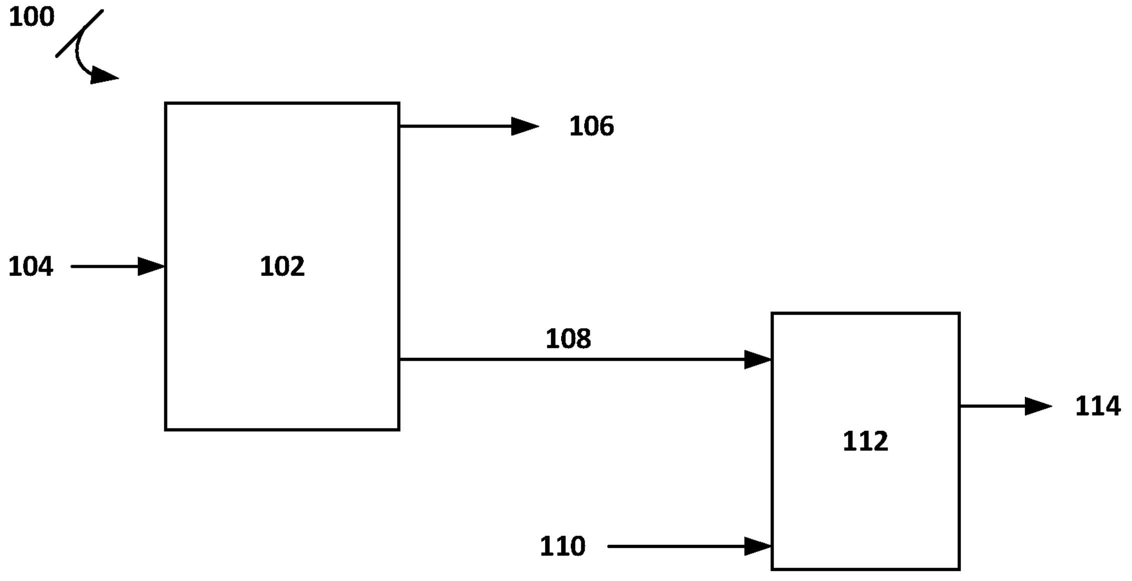
FIG. 1 is diagrammatic representation of a system with a depolymerization unit and a hydrocarbon processing unit for processing a mixed plastic waste feed to produce a high value chemical product, according to an embodiment.

The present disclosure describes various embodiments related to processes, devices, and systems for decontaminating and converting mixed plastic waste (MPW) to high value chemical (HVC) products, such as ethylene, propylene, butenes, pentenes, hexenes, heptenes, octenes, nonenes, decenes, benzene, toluene, xylenes, and ethyl benzenes, including alpha and internal olefins, linear or branched carbon chains, dienes, and trienes. Indeed, the HVC products of certain embodiments include light gas C2-C4 olefins and aromatics, such as benzene, toluene, xylene, and ethyl benzene (commonly known as BTXEB). More specifically, the present disclosure relates to systems and methods for converting MPW to a hydrogen-rich hydrocarbon stream or molten oligomer stream that is subsequently processed, either separately or combined with a hydrogen-lean hydrocarbon stream in a hydrocarbon processing unit, such as a fluid catalytic cracking (FCC) unit, a catalytic naphtha reformer unit, a steam cracking unit, a hydrocracking unit, or a thermal hydrocracking unit. These systems and methods produce high value chemical products using one or a combination of hydrocarbon processing units optimized for high value chemical products yield and low coke formation.

In certain embodiments, the hydrogen-lean hydrocarbon streams can include atmospheric residue (AR), straight run vacuum gas oil (VGO), cracked vacuum gas oil, synthetic crude oil, and crude oil. In certain embodiments, these systems and methods can produce about 70% high value chemical products yield from mixed plastic waste feeds. In certain embodiments, the hydrogen-rich hydrocarbon FCC feeds made from mixed plastic waste are in a polymeric or oligomeric form, which is molten or liquefied in hydrogen-lean hydrocarbon streams. In certain embodiments, the molten mixed plastic waste is subject to further processing to remove non-hydrocarbon components prior to supplying the molten mixed plastic waste to the hydrocarbon processing unit.

Further embodiments may be described and disclosed. In the following description, numerous details are set forth in order to provide a thorough understanding of the various embodiments. In other instances, well-known processes, devices, and systems may not have been described in particular detail in order not to unnecessarily obscure the various embodiments. Additionally, illustrations of the various embodiments may omit certain features or details in order to not obscure the various embodiments.

The description may use the phrases “in certain embodiments,” “in various embodiments,” “in an embodiment,” or “in embodiments,” which may each refer to one or more of the same or different embodiments. Furthermore, the terms “comprising,” “including,” “having,” and the like, as used with respect to embodiments of the present disclosure, are synonymous. The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "removing," "removed," "reducing," "reduced," or any variation thereof, when used in the claims and/or the specification includes any measurable decrease of one or more components in a mixture to achieve a desired result. The use of the words "a" or "an" when used in conjunction with any of the terms "comprising," "including," "containing," or "having," in the claims or the specification may mean "one," but it is also consistent with the meaning of "one or more," "at least one," and "one or more than one." The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

Embodiments of methods and systems described here are utilized to process a mixed plastic waste (MPW) feed to produce mixed cracked products, such as ethylene, propylene, butenes, pentenes, hexenes, heptenes, octenes, nonenes, decenes, benzene, toluene, xylenes, and ethyl benzenes, including alpha and internal olefins, linear or branched carbon chains, dienes, and trienes. These products can be produced in an FCC unit with the high value chemical (HVC) products being harvested from the mixed cracked products. One such method includes the steps of introducing a mixed plastic waste feed containing a plurality of plastic polymers to a depolymerization unit and operating this depolymerization unit at a temperature and a residence time sufficient to melt the mixed polymers to a hydrogen-rich molten oligomers product stream. In certain embodiments, the MPW feed can be in the form of ground, shredded, chopped, or micronized mass.

The method further includes the step of supplying the hydrogen-rich molten oligomers product stream and a hydrogen-lean hydrocarbon stream to a hydrocarbon processing unit. In certain embodiments, the hydrogen-rich hydrocarbon stream can, separately or combined with hydrogen-lean hydrocarbon streams, be processed in one or more hydrocarbon processing units. These units can be more or more of a fluid catalytic a cracking (FCC), a hydrocracking (HC), a coking (DC), a hydrotreating (HT), a steam cracking (SC), a catalytic naphtha reforming unit, and a naphtha hydrotreating (NHDT) unit. In certain embodiments, the hydrocarbon processing units can operate in isolation or in a series with any one or more of the hydrocarbon processing units. In certain embodiments, the combination of the hydrogen-rich hydrocarbon stream and the hydrogen-lean hydrocarbon streams is between 0 and 100%.

In certain embodiments, the hydrogen-rich molten oligomers product stream is processed to remove inorganic or insoluble components from the stream prior to feeding to the hydrocarbon processing unit. In other embodiments, the hydrogen-rich molten oligomers product stream is devolatilized to remove inert gases, low boiling hydrocarbons, and heteroatom compounds prior to feeding to the hydrocarbon processing unit. In certain embodiments, vacuum can optionally be used to pull out light gases containing volatile hydrocarbons rich in chlorine, nitrogen, sulfur, and other heteroatoms. In certain embodiments, the hydrogen-rich molten oligomers product stream is combined with a hydrogen-lean hydrocarbon stream prior to feeding to a hydrocarbon processing unit.

In certain embodiments, the depolymerization unit is operated at a temperature to ensure complete melting without polymer decomposition and is dependent upon the composition of polymers present in the mixed waste polymer feed. In certain embodiments, the depolymerization unit is operated at the temperature ranging from about 220° C. to about 500° C. and the residence time of less than 1 hour.

The depolymerization unit can be a reactor equipped with an extruder, an auger, a screw, disk ring reactor, kneader, kiln, stirred tank reactor, wiped film kneader evaporator, tubular reactor, or combinations thereof. The depolymerization unit can be or include multiple forms of melt extrusion, namely single screw, twin screw (co-rotating and counter-rotating), meshing and non-meshing screws, with the configuration of screw elements and barrel configuration including devolatilization. The melt extrusion screw elements can include one or more of kneading, conveying, reacting, mixing, back flow, degassing, and melting configurations, with low, medium, and high shear zones. The addition of selected screw element blocks can create zones that work like continuous stirred tank depolymerization reactors. In certain embodiments, other methods of depolymerization can include one or more of mechanical milling, solvolysis, microbial, biocatalytic, enzymatic, ultrasonification, photo-degradation, UV degradation, supercritical $CO_2$ induced, and chemical depolymerization. In certain embodiments, methods of depolymerizing mixed waste plastics are developed to produce molten or liquefied oligomeric streams or hydrogen-rich hydrocarbon streams.

In an embodiment, the hydrogen-rich molten oligomers product stream contains less than 10 wt. % of additional aromatics not present in the MPW feed (typically <5 wt. %). In an embodiment, the hydrogen-rich molten oligomers product stream contains less than 5 wt. % of additional aromatics not present in the MPW feed. In a certain embodiment, the hot filtered hydrogen-rich hydrocarbon stream is optionally collected in a hot feed tank before feeding the FCC unit, which provides additional residence time to remove further heteroatoms present as volatiles. This hot feed tank can be under vacuum or purged and/or bubbled with a stripping gas stream to help in removing the volatiles. The hold-up time in this hot feed tank assists in further cracking and removal of heteroatoms. In certain embodiments, the average molecular weight of the hydrogen-rich molten oligomers product stream is at least twenty times lower than average molecular weight of the mixed plastic waste feed. In certain embodiments, the depolymerization unit is equipped with a thermally or electrically heated auger or extruder to partially depolymerize the polymer chains into a waxy fluid having a molecular weight of between 6,000 to 10,000 g/mol. In certain embodiments, the average molecular weight of the hydrogen-rich molten oligomers product stream is less than 100,000 g/mol. In certain embodiments, the partially depolymerized product can have a vacuum gas oil boiling point range of between about 350° C. to about 550° C. In certain embodiments, the hydrogen-rich molten oligomers product stream has a viscosity of less than about 10 centiPoise (cP) at a temperature ranging from about 300° C. to about 400° C.

In certain embodiments, the method further includes the step of adding a depolymerization additive to the MPW feed in the depolymerization unit. The depolymerization additive can be one or more of a depolymerization accelerator, a peroxide, an organometallic compound, oxygen or an oxygen containing species, or a cracking catalyst.

In certain embodiments, the molten oligomer product is furthered processed by hydroprocessing to chemically convert unsaturated hydrocarbons and heteroatom compounds to minimize gum formation and chloride corrosion at cracking unit operating temperatures. The conversion can be completed by hydroprocessing the molten oligomer product prior to feeding into a subsequent cracking unit.

In certain embodiments, the waxy fluid from the depolymerization unit can optionally be hot filtered, slurry settled, or centrifuged to remove inorganic and other insoluble components. Vacuum can optionally be used to pull out light gases containing volatile hydrocarbons rich in chlorine, nitrogen, sulfur and other heteroatoms. In certain embodiments, the method further includes the steps of passing the hydrogen-rich molten oligomers product stream to a melt filtration unit to remove a portion of the inorganic products and insoluble components before supplying the molten oligomer product to either the FCC unit or a hydrocarbon processing unit, either separately or in combination with hydrogen-lean hydrocarbon streams. In certain embodiments, the method further includes the step of passing the hydrogen-rich molten oligomers product stream to a slurry settler unit to remove a portion of the inorganic products and insoluble components. In certain embodiments, the method further includes the step of passing the hydrogen-rich molten oligomers product stream to a centrifugation unit to remove a portion of the inorganic products and insoluble components. Valuable chemicals can be separated from light gases thus recovered, while other hydrocarbons can optionally be used as fuels. The hot filtered hydrogen-rich molten oligomers product stream is optionally collected in a hot feed tank, before feeding a second cracking unit, which provides additional residence time to remove further heteroatoms as volatiles. In certain embodiments, the hot feed tank is under vacuum, head space purged, and/or bubbled with gas stream to help in removing volatiles. The hold-up time in this hot feed tank assists in further cracking and removal of heteroatoms.

In certain embodiments, the method of processing the MPW feed includes the steps of introducing a MPW feed containing a plurality of plastic polymers to a depolymerization unit and operating the depolymerization unit at a temperature and a residence time sufficient to melt and convert the plurality of plastic polymers to a hydrogen-rich molten oligomers product stream. The method further includes the step of supplying the hydrogen-rich molten oligomers product stream to a first cracking unit containing a cracking catalyst to produce a first hydrocarbonaceous stream and a first slurry stream containing a portion of the cracking catalyst, the inorganic products, and residual hydrocarbons. In an embodiment, the first cracking unit is a continuous cracking unit. In certain embodiments, the cracking catalyst has a halide, and more specifically a chloride, scavenging capability. In certain embodiments, the cracking catalyst is an acidic catalyst to further crack polymer chains. In an embodiment, the cracking catalyst favors production of the first hydrocarbonaceous stream with greater paraffin content as compared to iso-paraffin content. In certain embodiments, the hydrogen-rich molten oligomers product stream is fed continuously and converted to the first hydrocarbonaceous stream in less than two and half hours in the catalytic reactor. In an embodiment, the depolymerization unit is a batch reactor to convert the MPW feed to liquids that can optionally be distilled to separate into streams of desired compositions. In an embodiment, the catalytic cracking unit is a batch reactor to convert the hydrogen-rich molten oligomers product stream to liquids that can optionally be distilled for separation into streams of desired compositions.

The method further includes the step of passing the first slurry stream from the first cracking unit to a first separation unit to produce a second slurry stream containing the inorganic products and residual hydrocarbons, as well as a catalyst-rich stream containing the portion of the cracking catalyst. In an embodiment, the catalyst-rich stream is recycled to the first cracking unit. In certain embodiments, the first separation unit is a coking unit to produce coke solids containing inorganic products, and heavy metals. In certain embodiments, the first separation unit is operated at a temperature of between about 485° C. to about 530° C. The method further includes the step of introducing the second slurry stream to a second separation unit to produce a second hydrocarbonaceous stream containing the residual hydrocarbons and an inorganic products-rich stream.

In an embodiment, the second separation unit is a coking unit, and the second slurry is processed to remove the inorganic products and drop metal content in feed as coke. The method further includes the steps of delivering the first hydrocarbonaceous stream and the second hydrocarbonaceous stream to a distillation unit to produce a distillate stream and a bottoms stream containing residual hydrocarbons, metals, and residual inorganic products. The method further includes the step of processing the bottoms stream in a third separation unit to remove the metals and the residual inorganic products and to produce a recovered hydrocarbon stream.

In certain embodiments, the third separation unit is a coking unit, and the bottoms stream is processed to remove the residual inorganic products as coke along with metals in feed. In certain embodiments, the recovered hydrocarbon stream is mixed with the distillate stream to produce the hydrogen-rich hydrocarbon stream.

In certain embodiments, the method further includes passing the hydrogen-rich molten oligomers product stream to a fourth separation unit to remove one or more light gases containing volatile hydrocarbons rich in one or more of chloride, nitride, and sulfide before supplying the hydrogen-rich molten oligomers product stream to the cracking unit. In certain embodiments, the fourth separation unit is a vacuum separation unit, or a hot feed holding tank with gas head space purge and/or bubbling.

In certain embodiments, the hydrogen-rich liquid hydrocarbon stream and a hydrogen-lean hydrocarbon stream are fed to a second cracking unit. This cracking unit can be an FCC unit that is operated under conventional fuels conditions. In certain embodiments, the FCC unit is operated under a high severity condition in which the cracking temperature is between 450° C. and 750° C., and the catalyst to hydrocarbon feed ratio is between 4 to 60, with a residence time target of between 100 msec to 2 sec. In certain embodiments, the high severity conditions include a catalyst to hydrocarbon feed ratio of 4 to 30. In certain embodiments, the FCC unit is operated under hydropyrolysis conditions where the cracking is assisted in an excess hydrogen environment. In certain embodiments, the cracking products from FCC is further processed using steam cracking to increase the yield of high value chemicals. In certain embodiments, the FCC cracked gas and naphtha saturates stream is processed by steam cracking operating at a temperature of between about 750° C. to about 900° C.

In certain embodiments, the hydrogen-rich hydrocarbon stream, separately or combined with hydrogen-lean hydrocarbon streams, is processed under hydrocracking conditions followed by FCC, naphtha reforming, or steam cracking conditions. In certain embodiments, the hydrogen-rich hydrocarbon stream, separately or combined with hydrogen-lean hydrocarbon streams, is processed under naphtha hydrotreating conditions followed by steam cracking conditions. In certain embodiments, the hydrogen-rich hydrocarbon stream, separately or combined with hydrogen-lean hydrocarbon streams, is processed under coking conditions to remove coke followed by hydrotreating, FCC, catalytic naphtha reforming, or steam cracking conditions to treat the gas and liquids there formed. In certain embodiments, the hydrogen-rich molten oligomers stream, separately or combined with hydrogen-lean hydrocarbon streams, is processed under hydrotreating conditions followed by steam cracking conditions. In certain embodiments, the molten oligomer stream, separately or combined with hydrogen-lean hydrocarbon streams, is processed under coking conditions to remove coke followed by FCC conditions. In certain embodiments, the molten oligomer stream, separately or combined with hydrogen-lean hydrocarbon streams, is processed under catalytic naphtha reforming conditions. In certain embodiments, the molten oligomer stream is processed under distillation conditions followed by refinery processing conditions.

In another embodiment, a heavy end of the hydrogen-rich molten oligomers product stream, which is enriched with metal contaminants, from the second cracking unit, is separated from the catalyst and subjected to a coking step to maximize recovery of decontaminated liquids. The metal contaminants from the MPW are now rejected as coke. The catalyst is recycled to the reactor continuously for supporting further reactions.

FIG. 1 is diagrammatic representation of a system 100 with a depolymerization unit 102 and a hydrocarbon processing unit 112 for processing a mixed plastic waste feed 104 to produce a high value chemical product 114, according to an embodiment. This system 100 includes the introducing the mixed plastic waste feed 104 to the depolymerization unit 102 with a first inlet, a mixing element, a first outlet, and a second outlet. The first inlet has an opening to receive therethrough the mixed plastic waste feed 104 containing a plurality of plastic polymers. The depolymerization unit 102 is operated at a temperature and a residence time sufficient to either completely melt the plurality of plastic polymers without depolymerization, or at least partially depolymerize the plurality of plastic polymers in the mixed plastic waste feed 104 to produce a gas stream 106 and a molten hydrogen-rich hydrocarbon stream 108. The first outlet has an opening to receive and transfer the produced gas stream 106. The system 100 further includes the hydrocarbon processing unit 112 with a second inlet, third inlet, and third outlet. The second inlet has an opening connected to and in fluid communication with the second outlet to receive the molten hydrogen-rich hydrocarbon stream 108 from the depolymerization unit 102. The third inlet has an opening to receive therethrough the hydrogen-lean hydrocarbon stream 110. The hydrocarbon processing unit 112 is operated at a temperature ranging from 400° C. to 750° C. to produce the high value chemical product 114. The third outlet has an opening to receive therethrough and transfer the high value chemical product 114.

In certain embodiments, the depolymerization unit 102 can include one of the following: an extruder, an auger, a screw feeder, a piston in a feed chamber, a block and feed type of manifold, a disk ring reactor, a kneader, a kiln, a stirred tank reactor, a wiped film kneader evaporator, a tubular reactor, or combinations thereof. In an embodiment, the depolymerization unit 102 is a continuous reactor. The depolymerization unit 102 is also equipped with a heating mechanism. In an embodiment, the heating mechanism is disposed along the length thereof of the unit equipped an extruder, an auger, or a screw feeder, a disk ring reactor, a kneader, a kiln, a stirred tank reactor, a wiped film kneader evaporator, or a tubular reactor.

In certain embodiments, a combination or arrangement of screw or mixing elements and/or internal components is arranged to increase heat transfer throughout the mixed plastic waste feed 104. The depolymerization unit 102 is an equipment that promotes high degrees of heat transfer, provides large surface areas and continuous renewal of surfaces, and is capable of handling high viscosity melts. This combination allows to optimize the reaction conditions, such that the heat transfer issues associated with high viscosity melts is addressed in an equipment configured to handle uniform mixing/kneading and conveying the mixed plastic waste feed 104 with minimal wall layer build ups and self-cleaning. In certain embodiments, operation of this depolymerization unit 102 leads to production of reduced gas, such as compared to units without high degrees of heat transfer, large surface areas, and high viscosity management features.

In certain embodiments, the molten hydrogen-rich hydrocarbon stream 108 is subject to uniform mixing at a low residence time of less than one hour and a low temperature gradient in the depolymerization unit 102. The overall gas production is reduced in this system 100 of manufacturing of the molten hydrogen-rich hydrocarbon stream 108. The gas stream 106 separated from the mixed plastic waste feed 104 and exiting the first outlet can include hydrogen, methane, ethane, propane, butane, $C_2$ to $C_4$ olefins, higher hydrocarbons, cracked gases, heteroatom volatiles, nitrogen, or combinations thereof.

In certain embodiments, the gas stream 106 from the partial depolymerization is subjected to further condensation to generate a condensable hydrocarbon liquid and a non-condensable gas. The non-condensable gases can include hydrogen, methane, ethane, propane, butane, $C_2$ to $C_4$ olefins and heteroatom volatiles. The condensable hydrocarbon liquids include hydrocarbons from $C_5$-$C_{22}$ hydrocarbons. As used herein, non-condensable gases may generally refer to molecules having dew point temperatures that are below regular operating temperatures of condensation operations of the system 100. The condensable hydrocarbon liquid can be processed with hydrocarbonaceous streams from the system 100 to produce additional hydrogen-rich hydrocarbon streams.

In certain embodiments, the depolymerization unit 102 is one or more of an extruder, a twin screw reactor, an auger reactor, a disk ring reactor, a wiped film kneader evaporator, or a kneader, with a narrow clearance between screw and barrel. This arrangement provides an environment of intense heat transfer that ensures that no portion of the melt bypasses or short circuits the heated flow path provided between the inlet and the outlet of the reactor (e.g., depolymerization unit 102). The mixing element (such as the screw or auger element) in the reactor ensures a thorough mixing of content of the reactor, a more uniform cross sectional temperature in the reactor cross section, and a reliable conveyance of material from inlet to outlet. In certain embodiments, the reactor is externally heated with temperature set point controls to impose a temperature profile along the reactor length from inlet to outlet. This temperature profile can be varied for improved operations of the reactor. The reactor also has provision for feeding a sweep gas from inlet to outlet, or vacuum suction, so as to remove gas products generated in the depolymerization process. This sweep gas can be an inert gas under the conditions of the processing environment. For example, this sweep gas can be a recycle gas from the product containing $C_1$ to $C_4$ hydrocarbon, inert gas like nitrogen, or can also be a hot flue gas to remove gas products generated in the process as well provide a direct heating within the reactor.

In an embodiment, the depolymerization unit 102 is operated at a temperature ranging from about 220° C. to about 500° C. degrees and can include a temperature profile from the inlet to outlet. The operating temperature can also range more specifically from about 380° C. to about 450° C. degrees. In an embodiment, the depolymerization unit 102 is operated at a residence time of less than 15 minutes. In an embodiment, the depolymerization unit 102 is operated at a residence time of less than 5 minutes. The reduced residence time of the mixed plastic waste feed 104 in the depolymerization unit 102 reduces gas loss and ensures the cracking, depolymerization, and/or melting of plastics in the mixed plastic waste feed 104 to molten hydrogen-rich hydrocarbon stream 108.

Stream 108 can be a hydrocarbonaceous wax stream containing compounds of lower molecular weight (6000-10000 g/mol) or lower in the vacuum gas oil boiling range. The molten hydrogen-rich hydrocarbon stream 108 can be fed directly or in combination with hydrogen-lean hydrocarbon streams 110 to the hydrocarbon processing unit 112 for cracking the molten hydrogen-rich hydrocarbon stream 108 into high value chemical product 114. This provision also reduces the loss of liquid components as gaseous products. This processing step ensures that the hydrocarbon processing unit does not receive a highly viscous stream at operating temperatures with substantial heat transfer issues and coke formation.

Certain embodiments can include the use of one or more depolymerization additives to the depolymerization unit 102 to accelerate the rate of partial depolymerization. The depolymerization additives can include a depolymerization accelerator/organometallic compound, a cracking catalyst, or combinations thereof. The depolymerization accelerator/organometallic compound can include a metal octonoate, a metal naphthenate, a metal stearate, metallocenes, or combinations thereof. The metal in the organometallic compound can be Ni, Mo, Co, W, Fe, transitional metals, or combinations thereof.

In certain embodiments, the solid catalyst/depolymerization additives are configured to accelerate the depolymerization rate in the depolymerization unit 102 so that the targeted molecular weight reduction is achieved at a reduced residence time. Non-limiting examples of solid catalysts/depolymerization additives include an inorganic oxide, aluminosilicates including ZSM-5, an X-type zeolite, a Y-type zeolite, a USY-zeolite, mordenite, faujasite, nano-crystalline zeolites, MCM mesoporous materials, SBA-15, a silico-alumino phosphate, a gallium phosphate, and a titanophosphate, a molecular sieve, or combinations thereof. In certain embodiments, the depolymerization additive is present in the liquid form. Certain embodiments include use of a depolymerization additive that functions to scavenge chlorides and enhance production of straight chain hydrocarbons over branched hydrocarbons. For example, metal loaded aluminosilicates can be used to facilitate the scavenging of chlorides as well as enhancing production of straight chain hydrocarbons over branched hydrocarbons.

In certain embodiments, the mixed plastic waste feed 104 used in the continuous reactor is associated with substantial amounts of inorganics, such as fillers and additives. Thus, as the molten hydrogen-rich hydrocarbon stream 108 also contains these inorganics, this stream 108 can be optionally hot filtered, settled, or centrifuged to remove the inorganics. This molten hydrogen-rich hydrocarbon stream 108 can be fed to a hydrocarbon processing unit 112 for further cracking to produce the high value chemical products. The molten hydrogen-rich hydrocarbon stream 108 can optionally be collected in a hot feed tank before feeding to the hydrocarbon processing unit 112. The holdup time in hot feed tank provides additional time for removal of heteroatom volatiles.

In the hydrocarbon processing unit 112, the molten hydrogen-rich hydrocarbon stream 108, separately or combined with a hydrogen-lean hydrocarbon stream 110, is further cracked to provide a high value chemical product 114. The shorter residence time prevents or reduces over-cracking and loss of hydrogen and hydrogen-rich gases from the molten hydrogen-rich hydrocarbon stream 108. In certain embodiments, the hydrocarbon processing unit 112 is operated in one of three modes, including conventional fuels, high severity, and hydropyrolysis modes to generate high value chemicals. In certain embodiments, some of these generated hydrocarbons leave the hydrocarbon processing unit 112 as a lighter overhead product (crackable gas and crackable condensable liquid). This fraction of crackable gas and crackable condensable liquid may be subjected to further cracking in downstream units to produce additional high value chemicals. The condensable hydrocarbon liquid is processed with hydrocarbonaceous streams from the system to produce additional hydrogen-rich hydrocarbons.

Figure 2:
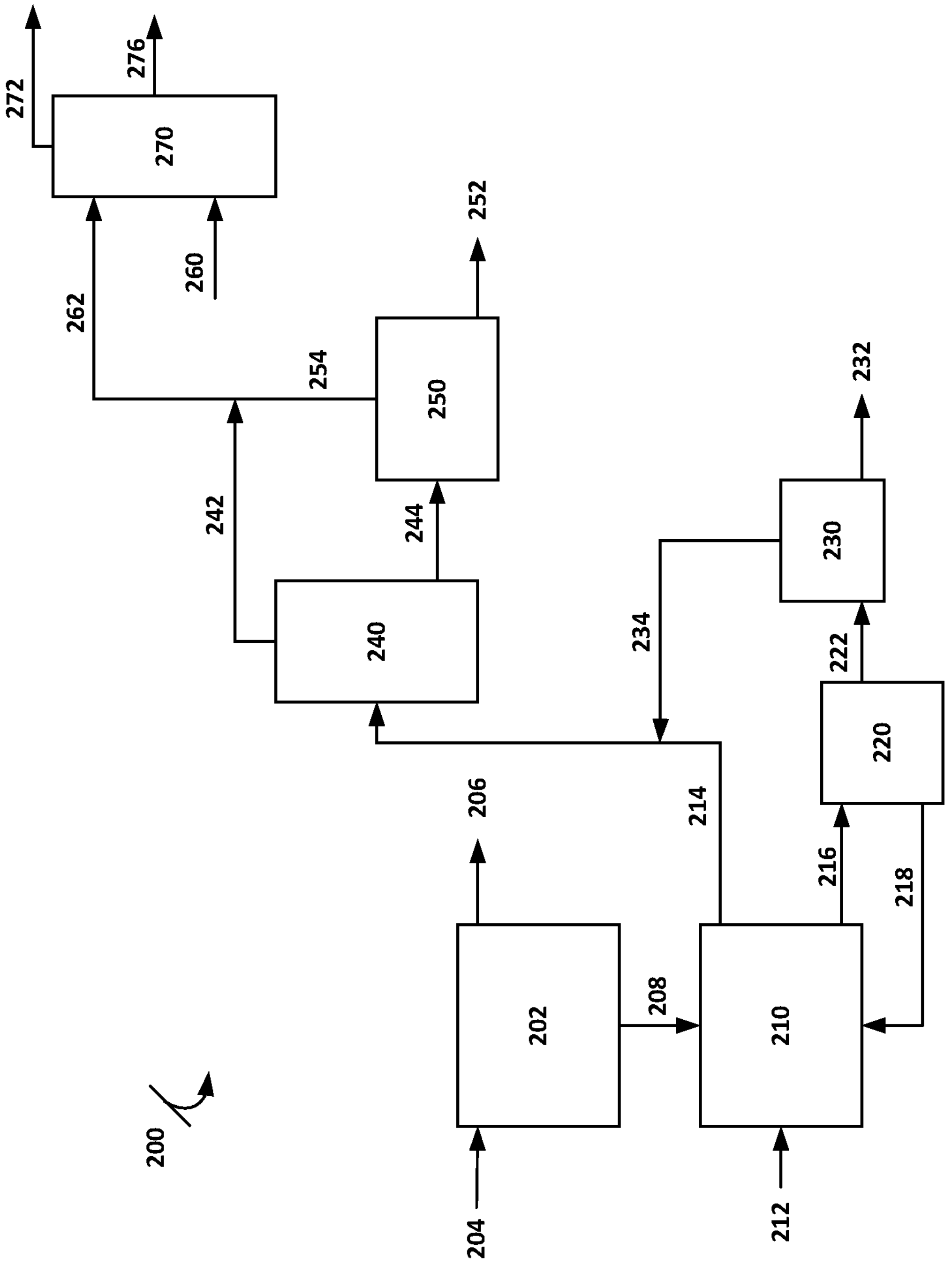
FIG. 2 is a diagrammatic representation of a system with a depolymerization unit, a catalytic cracking unit, and an FCC unit for processing a mixed plastic waste feed to produce a high value chemical product, according to an embodiment.

Embodiments also include additional systems for processing a mixed plastic waste feed to produce a high value chemical stream. FIG. 2 is a diagrammatic representation of a system 200 with a depolymerization unit, a catalytic cracking unit, and an FCC unit for processing a mixed plastic waste feed to produce a high value chemical product, according to an embodiment. This system for processing a mixed plastic waste feed 204 to produce a hydrogen-rich molten oligomers stream 208 includes introducing a mixed plastic waste feed to a depolymerization unit 202 unit with a first inlet, a first outlet, and a second outlet. The first inlet has an opening to receive therethrough a mixed plastic waste feed 204 containing a plurality of plastic polymers. The depolymerization unit 202 is operated at a temperature and a residence time sufficient to at least partially depolymerize the plurality of plastic polymers in the mixed plastic waste feed 204 to produce a gas stream 206 and a hydrogen-rich molten oligomers stream 208. The first outlet has an opening to receive and transfer the produced gas stream 206 containing the volatile hydrocarbons and heteroatoms.

The system 200 further includes a first cracking unit 210 with a second inlet, a third inlet, a fourth inlet, a third outlet, and a fourth outlet. The second inlet is connected to and in fluid communication with the second outlet to receive the hydrogen-rich molten oligomers stream 208 containing inorganic products from the depolymerization unit 202. The third inlet has an opening to receive therethrough a hydrogen stream 212. The first cracking unit 210 contains a cracking catalyst and is operated to produce a first hydrocarbonaceous stream 214 and a first slurry stream 216. The first slurry contains a portion of the cracking catalyst, the inorganic products, and residual hydrocarbons and is passed to a first separation unit 220 with a fifth inlet, fifth outlet, and sixth outlet. The fifth inlet is connected to and in fluid communication with the fourth outlet to receive the first slurry stream 216 from the first cracking unit 210. The first separation unit 220 produces a second slurry stream 222 and a catalyst-rich stream 218 containing a portion of the cracking catalyst. The fourth inlet of the first cracking unit 210 is connected to and in fluid communication with the sixth outlet to receive the supplied catalyst-rich stream 218 of the first separation unit 220. The second slurry stream 222 is introduced to a second separation unit 230 with a sixth inlet, fifth outlet, and sixth outlet. The sixth inlet is connected to and in fluid communication with the fifth outlet to receive the second slurry stream 222 from the first separation unit 220. The second separation unit 230 produces a second hydrocarbonaceous stream 234 containing residual hydrocarbons and an inorganics-rich product stream 232.

The system 200 further includes delivering the first hydrocarbonaceous stream 214 and second hydrocarbonaceous stream 234 to a distillation unit 240 with a seventh inlet, ninth outlet, and tenth outlet. The seventh inlet is connected to and in fluid connection with the third outlet and eighth outlet to receive the first hydrocarbonaceous stream 214 from the first cracking unit 210 and the second hydrocarbonaceous stream 234 from the second separation unit 230, respectively. The distillation unit 240 is operated to produce a distillate stream 242 and bottoms stream 244 containing residual hydrocarbons, metals, and residual inorganic products. The bottoms stream 244 is processed in a third separation unit 250 with an eighth inlet, eleventh outlet, and twelfth outlet to remove metals and the residual inorganic products 252. The eighth inlet is connected to and in fluid communication with the ninth outlet to receive the bottoms stream of the distillation unit 240. The third separation unit 250 produces a recovered hydrocarbon stream 254.

The system 200 further includes mixing the recovered hydrocarbon stream 254 and the distillate stream 242 to produce a hydrogen-rich hydrocarbon stream 262. The tenth outlet and twelfth outlet are connected and in fluid communication to be combined to produce the hydrogen-rich hydrocarbon stream 262. The hydrogen-rich hydrocarbon stream 262 is supplied to a second cracking unit 270 with a ninth inlet, tenth inlet, thirteenth outlet and fourteenth outlet. The ninth inlet is connected to and in fluid communication with the tenth outlet and twelfth outlet to receive the mixed hydrogen-rich hydrocarbon stream 262. The tenth inlet has an opening to receive therethrough a hydrogen-lean hydrocarbon feed 260 such as atmospheric residue, vacuum residue, a straight run vacuum gas oil, or a cracked vacuum gas oil. The second cracking unit 270 is operated at a temperature ranging from about 400° C. to about 750° C. to produce a HVC product 272. The FCC unit 270 can be run in conventional fuels, high severity, or hydropyrolysis conditions to produce a range of compositions of the HVC products 272. In an embodiment, the second cracking unit 270 also generates a low value chemical stream 276, including naphtha saturates and gaseous components, which can be fed to downstream processing units such as steam cracking to produce additional high value chemicals.

As further description of certain components of the system 200, the depolymerization unit 202 further contains a heat source to heat the mixed plastic waste feed to a temperature sufficient to at least partially depolymerize the plurality of plastic polymers in the mixed plastic waste feed 204 to produce the hydrogen-rich molten oligomers product stream 208 containing inorganic products from the mixed plastic waste feed 204. In an embodiment, the hydrogen-rich molten oligomers product stream 208 is supplied to a melt filtration system, a settler, or a centrifuge unit to remove a portion of the inorganic components in the hydrogen-rich molten oligomers product stream 208 before supplying this stream to the first cracking unit 210. The hydrogen-rich molten oligomers product stream 208 from the depolymerization unit 202 can be processed in several ways, as disclosed herein.

In an embodiment, the hydrogen-rich molten oligomers product stream 208 is subject to hot filtration, settling, or centrifugation and then sent to the first cracking unit 210. In an embodiment, the hydrogen-rich molten oligomers product stream is subject to hot filtration, subsequently held in a hot feed tank, and then sent to the first cracking unit 210. Additional residence time is provided in the hot feed tank for removing volatile heteroatom compounds. In another embodiment, the hydrogen-rich molten oligomers product stream from the depolymerization unit 202 is settled in a slurry settler and the clear liquid oligomers product stream is fed to the hot feed tank and then to the first cracking unit 210. In another embodiment, the hydrogen-rich molten oligomers product stream from the depolymerization unit 202 is fed directly to the first cracking unit 210.

Figure 3:
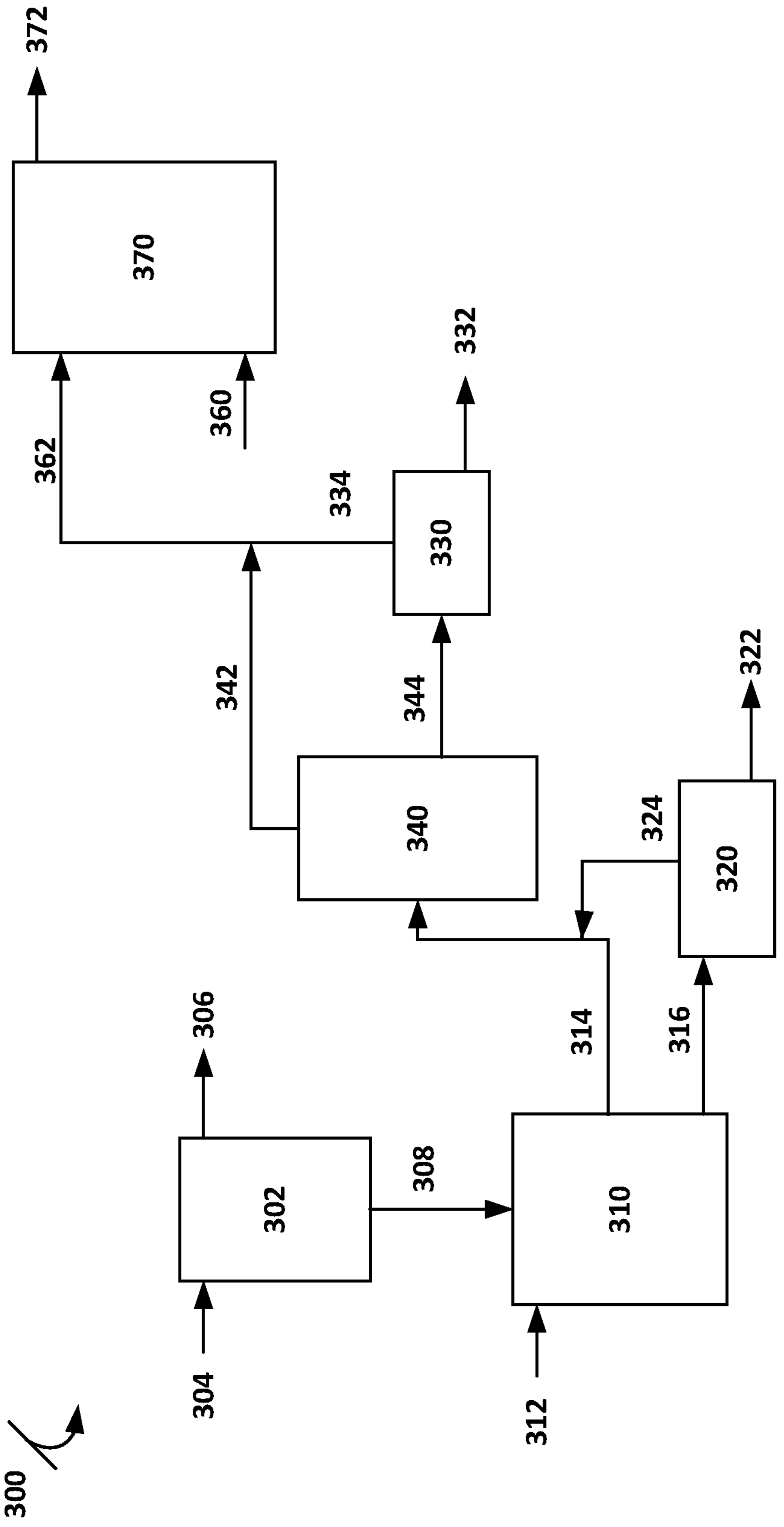
FIG. 3 is a diagrammatic representation of a system with a depolymerization unit, a thermal cracking unit, and an FCC unit for processing a mixed plastic waste feed to produce a high value chemical product, according to an embodiment.

FIG. 3 is a diagrammatic representation of a system 300 with a depolymerization unit, a thermal cracking unit, and an FCC unit for processing a mixed plastic waste feed to produce a high value chemical product, according to an embodiment. This system 300 introduces a mixed plastic waste feed 304 to a depolymerization unit 302 with a first inlet, a mixing element, a first outlet, and a second outlet. The first inlet has an opening to receive therethrough a mixed plastic waste feed 304 containing a plurality of plastic polymers. The depolymerization unit 302 further contains a heat source to heat the mixed plastic waste feed 304 to a temperature sufficient to at least partially depolymerize the plurality of plastic polymers in the mixed plastic waste feed 304. This heating therefore produces a hydrogen-rich molten oligomers product stream 308 containing inorganic products from the mixed plastic waste feed and a gas stream 306 containing volatile hydrocarbons and heteroatoms. The first outlet has an opening to receive the produced gas stream 306 containing the volatile hydrocarbons and heteroatoms.

The depolymerization unit 302 can be a reactor equipped with an extruder, an auger, a screw, a kneader, a disk ring reactor, a kiln, a stirred tank reactor, a wiped film kneader evaporator, a tubular reactor, or combinations thereof. In an embodiment, the hydrogen-rich molten oligomers product stream 308 contains less than ten weight percent (10 wt. %) of additional aromatics not present in feed. In certain embodiments, the average molecular weight of the hydrogen-rich molten oligomers product stream 308 is at least twenty times lower than average molecular weight of the mixed plastic waste feed.

The system further includes supplying the hydrogen-rich molten oligomers product stream 308 to a thermal hydrotreating unit 310 with a second inlet, a third inlet, a third outlet, and a fourth outlet. The second inlet is connected to and in fluid communication with the second outlet to receive the hydrogen-rich molten oligomers product stream 308 from the depolymerization unit 302. The thermal hydrotreating unit 310 is configured to produce a first hydrocarbonaceous stream 314 and a slurry stream 316 containing the inorganic products, and residual hydrocarbons. The third inlet of the thermal hydrotreating unit 310 has an opening to receive therethrough a hydrogen stream 312.

The system 300 further includes passing the first slurry stream 316 to a first separation unit 320 with a fourth inlet, a fifth outlet, and a sixth outlet. The fourth inlet is connected to and in fluid communication with the fourth outlet to receive the first slurry stream 316. The first separation unit 320 is configured to produce an inorganic products-rich stream 322 and a second hydrocarbonaceous stream 324 containing the residual hydrocarbons.

The system further includes delivering the first hydrocarbonaceous stream and second hydrocarbonaceous stream to a distillation unit 340 with a fifth inlet, a seventh outlet, and an eighth outlet. The fifth inlet is connected to and in fluid communication with the third outlet to receive the first hydrocarbonaceous stream 314 and with the fifth outlet to receive the second hydrocarbonaceous stream 324. The distillation unit 340 is configured to produce a distillate stream 342 and a bottoms stream 344 containing residual hydrocarbons, metals, and residual inorganic products.

The system further includes processing the bottoms stream 344 in a second separation unit 330 with a sixth inlet and a ninth outlet and a tenth outlet. The sixth inlet is connected to and in fluid communication with the eighth outlet to receive the bottoms stream 344. The second separation unit 330 is configured to remove the metals and the residual inorganic products 332 and to produce a recovered hydrocarbons stream 334. The recovered hydrocarbon stream 334 mixes with the distillate stream 328 to produce the hydrogen-rich hydrocarbon stream 362. In an embodiment, the recovered hydrocarbon stream 334 are combined with the distillate stream 342 from the eighth outlet and the sixth outlet, respectively, in the absence of a distinct mixer unit to form the hydrogen-rich hydrocarbon stream 362 that is supplied to a downstream processing unit 370.

The system 300 further includes supplying the hydrogen-rich hydrocarbon stream 362 separately or in combination with the hydrogen-lean hydrocarbon stream 360 to an FCC unit 370 with a seventh inlet, an eighth inlet, and an eleventh outlet. The seventh inlet is connected to and in fluid communication with the seventh outlet to receive the distillate stream 342 and with the tenth outlet to receive the recovered hydrocarbons stream 334. The eighth inlet has an opening to receive therethrough the hydrogen-lean hydrocarbon stream 362. FCC unit 370 can be run in conventional fuels, high severity, or hydropyrolysis conditions to produce a range of high value chemical compositions. The eleventh outlet has an opening to receive therethrough a HVC stream 372.

In certain embodiments, the FCC unit 370 also releases produces low value chemical stream, such as naphtha saturates and gaseous components, which can be fed to downstream processing units like steam cracking units to produce additional high value chemicals.

Figure 4:
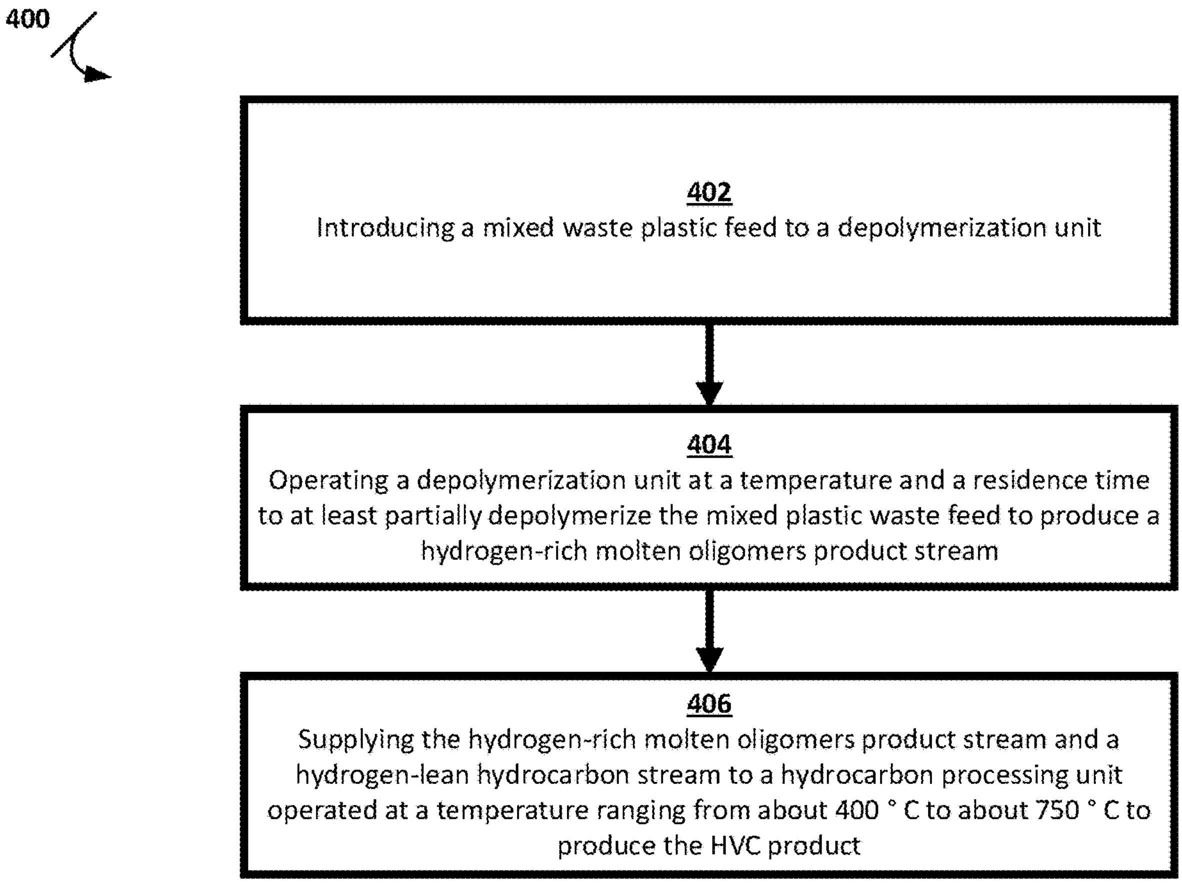
FIG. 4 is a diagrammatic representation of a method of converting a mixed plastic waste to a high value chemicals stream by depolymerizing the mixed plastic waste to a hydrogen-rich molten oligomers product stream, which can be fed together with a hydrogen-lean hydrocarbon stream to a hydrocarbon processing unit to produce the HVC product, according to an embodiment.

FIG. 4 is a diagrammatic representation of a method 400 for processing a mixed plastic waste feed to produce a high value chemical (HVC) product. This method for processing a mixed plastic waste feed includes the step 402 of introducing the mixed plastic waste feed containing a plurality of plastic polymers to a depolymerization unit. The next step 404 includes operating the depolymerization unit at a temperature and a residence time sufficient to at least partially depolymerize the plurality of plastic polymers in the mixed plastic waste feed to produce a hydrogen-rich molten oligomers product stream containing inorganics products from the mixed plastic waste feed and a gas stream containing volatile hydrocarbons and heteroatoms. In this step 404, the depolymerization unit can be operated at a temperature ranging from about 250° C. to about 500° C. and the residence time of less than 1 hour. In certain embodiments, the depolymerization unit is operated at a temperature ranging from about 250° C. to about 400° C. In certain embodiments, the hydrogen-rich molten oligomers product stream resulting from step 404 has a viscosity of less than about 10 centiPoise at a temperature ranging from about 300° C. to about 400° C. In certain embodiments, the average molecular weight of the hydrogen-rich molten oligomers product stream is at least twenty times lower than average molecular weight of the mixed plastic waste feed. The depolymerization unit in step 404 is a reactor equipped with one or more of an extruder, an auger, a screw, a kneader, a disk ring reactor, a kiln, a stirred tank reactor, a wiped film kneader evaporator, a tubular reactor, or combinations thereof. The method 400 further includes the step 406 of supplying the hydrogen-rich molten oligomers product stream and a hydrogen-lean hydrocarbon stream to a hydrocarbon processing unit. The hydrocarbon processing unit is operated at temperature ranging from about 400° C. to about 750° C. to produce the HVC product. The hydrogen-lean hydrocarbon stream can be an atmospheric residue, a vacuum residue, a straight run vacuum gas oil, or a cracked vacuum gas oil. The HVC product can include one or more of ethylene, propylene, butenes, pentenes, hexenes, heptenes, octenes, nonenes, decenes, benzene, toluene, xylenes, and ethyl benzenes, including alpha and internal olefins, linear or branched carbon chains, dienes, and trienes. The hydrocarbon processing unit can be one or more of a one or more of an FCC unit, a hydrocracking unit, a decoking unit, a naphtha hydrotreatment unit, a hydrotreating unit, and a steam cracking unit. Any of the foregoing hydrocarbon processing units can be operated individually or in a series with any of the other hydrocarbon processing units. In certain embodiments, the hydrogen-rich molten oligomers product stream and the hydrogen-lean hydrocarbon stream are mixed prior to being supplied to the hydrocarbon processing unit. In other embodiments, the hydrogen-rich molten oligomers product stream and the hydrogen-lean hydrocarbon stream are supplied individually to the hydrocarbon processing unit in pre-selected proportions. The mixture of the hydrogen-rich hydrocarbon stream and the hydrogen-lean hydrocarbon stream that is supplied to a hydrocarbon processing unit can contain an amount of the hydrogen-rich hydrocarbon stream ranging from about 5 weight percent of the mixture to about 95 weight percent of the mixture.

In certain embodiments, the method 400 further includes the step of passing the hydrogen-rich molten oligomers product stream to a melt filtration, a slurry settler, or a centrifuge unit to remove a portion of the inorganic products and insoluble components in the hydrogen-rich molten oligomers product stream, before supplying the hydrogen-rich molten oligomer product to the hydrocarbon processing unit. In certain embodiments, the method further includes the step of applying vacuum to the holding tank to further remove heteroatoms from the hydrogen-rich molten oligomers product stream, before supplying the hydrogen-rich molten oligomers product to the hydrocarbon processing unit.

In certain embodiments, the method 400 further includes the step of collecting the hydrogen-rich molten oligomers product stream in a holding tank to remove heteroatoms present as volatiles in the hydrogen-rich molten oligomers product stream, before supplying the hydrogen-rich molten oligomer product to the hydrocarbon processing unit. In certain embodiments, the method 400 further includes the step of passing a stripping gas stream through the hydrogen-rich molten oligomers product stream in the holding tank to further remove heteroatoms present as volatiles in the hydrogen-rich molten oligomers product stream, before supplying the hydrogen-rich molten oligomer product to the hydrocarbon processing unit.

In certain embodiments, the method 400 further includes the step of passing the hydrogen-rich molten oligomers product stream to a separation unit to remove a portion of chlorine compounds, nitrogen compounds, and sulfur compounds, before supplying the hydrogen-rich molten oligomer product to the hydrocarbon processing unit. In certain embodiments, the separation unit is a vacuum separation unit.

Figure 5:
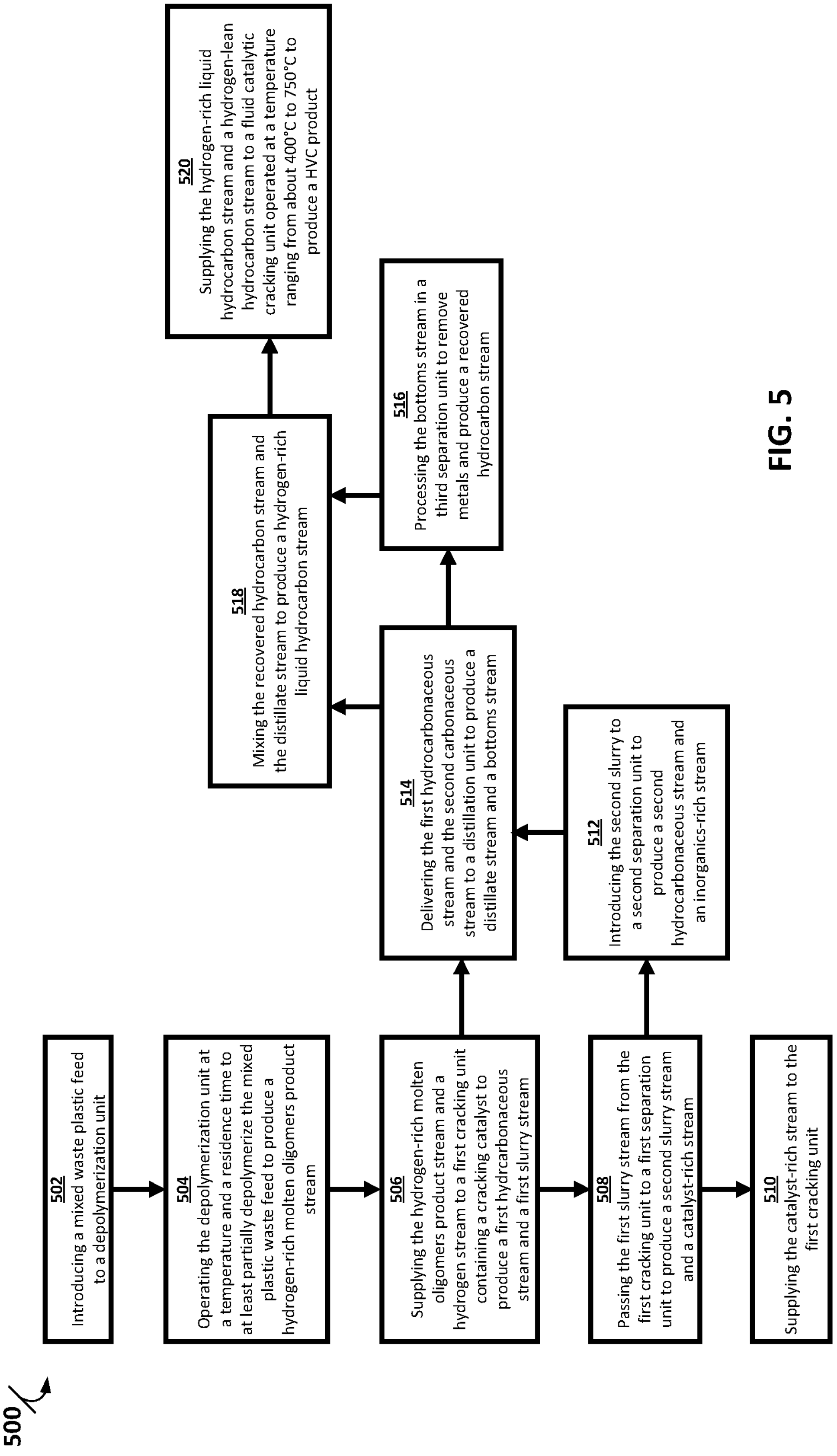
FIG. 5 is a diagrammatic representation of a method of converting a mixed plastic waste to a high value chemicals stream by depolymerizing the mixed plastic waste to a hydrogen-rich molten oligomers product stream, which can be refined using a number of refining steps to remove unwanted contaminants found in the mixed plastics waste feed. The refined hydrogen-rich molten oligomers can be fed together with a hydrogen-lean hydrocarbon stream to a hydrocarbon processing unit to produce the HVC product, according to an embodiment.

FIG. 5 is a block diagram of a method 500 for processing a mixed waste plastic waste feed to produce a high value chemical product. The method 500 for processing a mixed plastic waste feed includes the step 502 of introducing the mixed plastic waste feed containing a plurality of plastic polymers to a depolymerization unit, followed by the step 504 of operating the depolymerization unit at a temperature and a residence time sufficient to at least partially depolymerize the plurality of plastic polymers in the mixed plastic waste feed. In step, 504, the depolymerization unit is operated to produce a hydrogen-rich molten oligomers product stream containing inorganics products and a gas stream containing volatile hydrocarbons and heteroatoms. In this step 504, the depolymerization unit can be operated at a temperature ranging from about 250° C. to about 500° C. and with a residence time of less than 1 hour. In certain embodiments, the depolymerization unit is operated at a temperature ranging from about 250° C. to about 400° C. In certain embodiments, the hydrogen-rich molten oligomers product stream resulting from step 504 has a viscosity of less than about 10 centiPoise at a temperature ranging from about 300° C. to about 400° C. In certain embodiments, the average molecular weight of the hydrogen-rich molten oligomers product stream is at least twenty times lower than the average molecular weight of the mixed plastic waste feed. The depolymerization unit in step 504 is a reactor equipped with one or more of an extruder, an auger, a screw, a kneader, a wiped film kneader evaporator, a disk ring reactor, a kiln, a stirred tank reactor, a wiped film kneader evaporator, a tubular reactor, or combinations thereof. The method 500 further includes a step 506 of supplying the hydrogen-rich molten oligomers product stream to a first cracking unit containing a cracking catalyst to produce a first hydrocarbonaceous stream and a first slurry stream containing a portion of the cracking catalyst, the inorganic products, and residual hydrocarbons. In this step 506, the first cracking unit is a continuous cracking unit. The method 500 further includes the step 508 of passing the first slurry stream from the first cracking unit to a first separation unit to produce a second slurry stream containing the inorganic products and residual hydrocarbons and a catalyst-rich stream containing the portion of the cracking catalyst. The method 500 further includes the step 510 of supplying the catalyst-rich stream to the first cracking unit. The method 500 further includes the step 512 of introducing the second slurry stream to a second separation unit to produce a second hydrocarbonaceous stream containing the residual hydrocarbons and an inorganic products-rich stream. The method 500 further includes the step 514 of delivering the first hydrocarbonaceous stream and the second hydrocarbonaceous stream to a distillation unit to produce a distillate stream and a bottoms stream containing residual hydrocarbons, metals, and residual inorganic products. The method 500 further includes the step 516 of processing the bottoms stream in a third separation unit to remove the metals and the residual inorganic products and to produce a recovered hydrocarbon stream, and the step 518 of mixing the recovered hydrocarbon stream and the distillate stream to produce a hydrogen-rich liquid hydrocarbon stream. The method 500 further includes the step 520 of supplying the hydrogen-rich liquid hydrocarbon stream and a hydrogen-lean hydrocarbon stream to a fluid catalytic cracking unit operated at a temperature ranging from about 400° C. to about 750° C., to produce the HVC product. The hydrogen-lean hydrocarbon stream can be an atmospheric residue, a vacuum residue, a straight run vacuum gas oil, or a cracked vacuum gas oil. The mixed cracked products can include one or more of ethylene, propylene, butenes, pentenes, hexenes, heptenes, octenes, nonenes, decenes, benzene, toluene, xylenes, and ethyl benzenes, including alpha and internal olefins, linear or branched carbon chains, dienes, and trienes. HVC products, such as $C_2$-$C_4$ olefins and BTXEB, can be harvested from the mixed cracked products. In certain embodiments, the hydrogen-rich molten oligomers product stream and the hydrogen-lean hydrocarbon stream are mixed prior to being supplied to the hydrocarbon processing unit. In other embodiments, the hydrogen-rich molten oligomers product stream and the hydrogen-lean hydrocarbon stream are supplied individually to the hydrocarbon processing unit in pre-selected proportions. The mixture of the hydrogen-rich hydrocarbon stream and the hydrogen-lean hydrocarbon stream that is supplied to a hydrocarbon processing unit can contain an amount of the hydrogen-rich hydrocarbon stream ranging from about 5 weight percent of the mixture to about 95 weight percent of the mixture.

Figure 6:
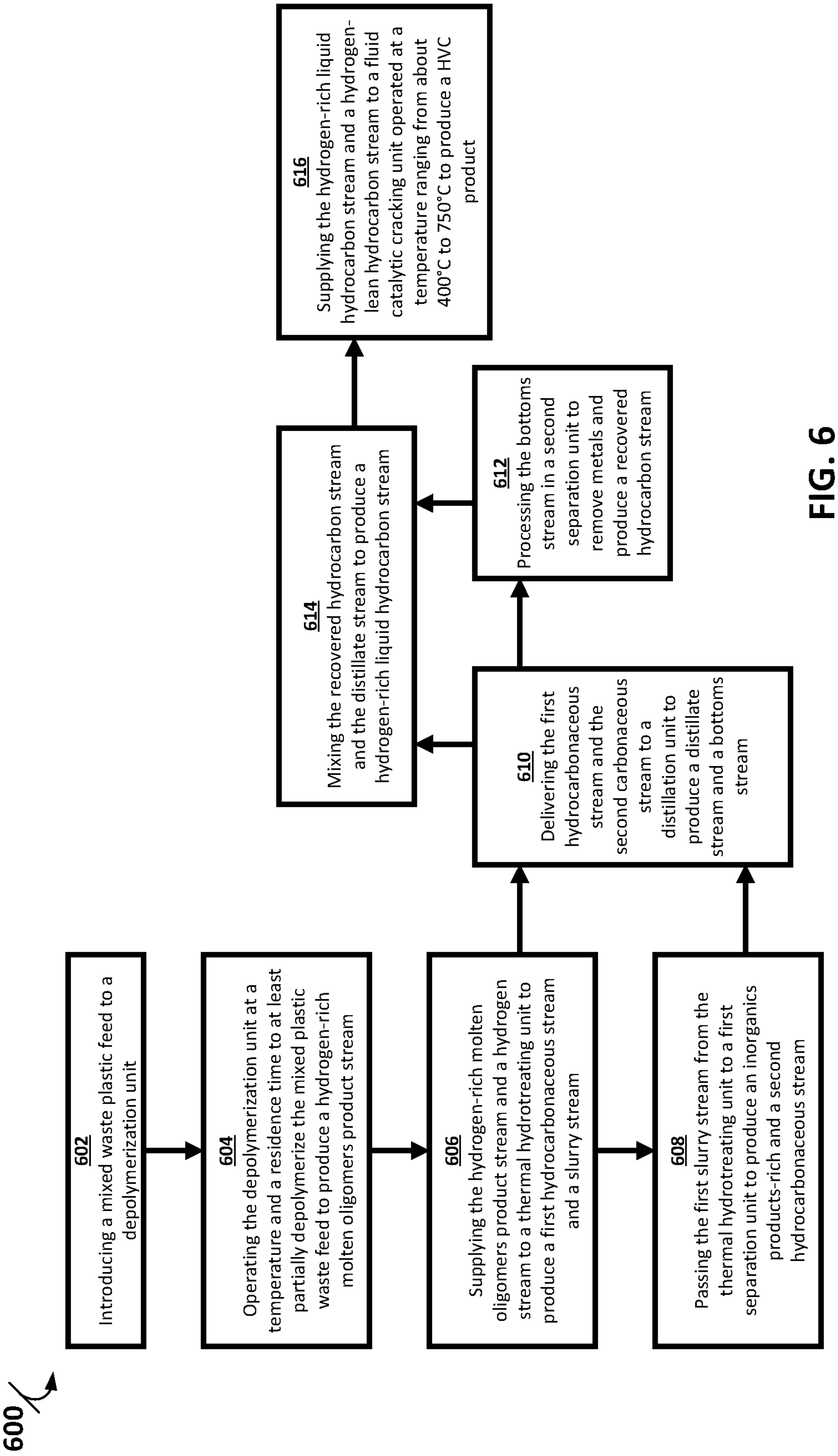
FIG. 6 is a diagrammatic representation of a method of converting a mixed plastic waste to a high value chemicals stream by depolymerizing the mixed plastic waste to a hydrogen-rich molten oligomers product stream, which is subjected to thermal hydrotreating prior to being refined and fed together with a hydrogen-lean hydrocarbon stream to a hydrocarbon processing unit to produce the HVC product, according to an embodiment.

FIG. 6 is a block diagram of a method 600 for processing a mixed waste plastic waste feed to produce a high value chemical product. The method 600 for processing a mixed plastic waste feed includes the step 602 of introducing the mixed plastic waste feed containing a plurality of plastic polymers to a depolymerization unit, followed by the step 604 of operating the depolymerization unit at a temperature and a residence time sufficient to at least partially depolymerize the plurality of plastic polymers in the mixed plastic waste feed. The depolymerization unit is operated to produce a hydrogen-rich molten oligomers product stream containing inorganics products and a gas stream containing volatile hydrocarbons and heteroatoms. In this step 604, the depolymerization unit can be operated at a temperature ranging from about 250° C. to about 500° C. and the residence time of less than 1 hour. In certain embodiments, the depolymerization unit is operated at a temperature ranging from about 250° C. to about 400° C. In certain embodiments, the hydrogen-rich molten oligomers product stream resulting from step 604 has a viscosity of less than about 10 centiPoise at a temperature ranging from about 300° C. to about 400° C. In certain embodiments, the average molecular weight of the hydrogen-rich molten oligomers product stream is at least twenty times lower than average molecular weight of the mixed plastic waste feed. The depolymerization unit in step 604 is a reactor equipped with one or more of an extruder, an auger, a screw, a kneader, a disk ring reactor, a kiln, a stirred tank reactor, a wiped film kneader evaporator, a tubular reactor or combinations thereof. The method 600 further includes the step 606 of supplying the hydrogen-rich molten oligomers product stream to a thermal hydrotreating unit to produce a first hydrocarbonaceous stream and a slurry stream containing the inorganic products and residual hydrocarbons. The method 600 further includes the step 608 of passing the first slurry stream from the thermal hydrotreating unit to a first separation unit to produce an inorganics products-rich stream and a second hydrocarbonaceous stream containing the residual hydrocarbons. The method 600 further includes the step 610 of delivering the first hydrocarbonaceous stream and the second hydrocarbonaceous stream to a distillation unit to produce a distillate stream and a bottoms stream containing residual hydrocarbons, metals, and residual inorganic products, as well as the step 612 of processing the bottoms stream in a second separation unit to remove the metals and the residual inorganic products and to produce a recovered hydrocarbon stream. The method 600 further includes the step 614 of mixing the recovered hydrocarbon stream and the distillate stream to produce a hydrogen-rich liquid hydrocarbon stream. The method 600 further includes the step 616 of supplying the hydrogen-rich liquid hydrocarbon stream and a hydrogen-lean hydrocarbon stream to a fluid catalytic cracking unit operated at a temperature ranging from about 400° C. to about 750° C., to produce the HVC product. The hydrogen-lean hydrocarbon stream can be an atmospheric residue, a vacuum residue, a straight run vacuum gas oil, or a cracked vacuum gas oil. The HVC product can include one or more of ethylene, propylene, butenes, pentenes, hexenes, heptenes, octenes, nonenes, decenes, benzene, toluene, xylenes, and ethyl benzenes, including alpha and internal olefins, linear or branched carbon chains, dienes, and trienes. In certain embodiments, the hydrogen-rich molten oligomers product stream and the hydrogen-lean hydrocarbon stream are mixed prior to being supplied to the hydrocarbon processing unit. In other embodiments, the hydrogen-rich molten oligomers product stream and the hydrogen-lean hydrocarbon stream are supplied individually to the hydrocarbon processing unit in pre-selected proportions. The mixture of the hydrogen-rich hydrocarbon stream and the hydrogen-lean hydrocarbon stream that is supplied to a hydrocarbon processing unit can contain an amount of the hydrogen-rich hydrocarbon stream ranging from about 5 weight percent of the mixture to about 95 weight percent of the mixture.

EXAMPLES

Various examples provided below illustrate selected aspects of the various methods of converting mixed plastic waste (MPW) to a liquid hydrocarbon product, such as synthetic crude oil or pyrolysis oil.

Example 1

Depolymerization of a mixed polyolefin feed containing virgin HDPE 23.2 wt. %, LDPE 25.6 wt. %, LLDPE 22 wt. %, PP 29.2 wt. % resins was studied in a devolatilization extruder at different temperature and at different feed rates, while keeping the rpm of the devolatilization extruder fixed at 100 rpm. The devolatilization extruder used for the study is a co-rotating twin screw extruder (Type omega 30 series). The length of the barrel is 1472 mm and the diameter of the screw is 29.7 mm (L/D=49.56). The devolatilization extruder includes 12 devolatilizing barrels that have proportional-controlled-derivative (PID) heating and cooling arrangement through a programmable logic controller (PLC). There were 6-barrel vent positions.

Heating is achieved by switching the solid-state relay to the control power to the heater assembled to the barrel, and the cooling is achieved by passing nitrogen operated by solenoid valves. The melt stream flowing out of the extruder was collected and analyzed for aromatics. Infrared (IR) analysis indicated no aromatics formation, even at an extruder temperature of 450° C. Gel permeation chromatography (GPC) analysis of the samples showed a significant drop in molecular weight. It is beneficial to maintain the extruder conditions and residence time such that there was significant cracking and lowering of molecular weight, without providing formation of new aromatics in the process.

About 50 g of the oligomer output from Example 1, where the extruder unit was operated at 450° C. at 100 rpm (1.1 kg/hr feed rate, 5827 mol. wt.) was charged into a round bottom flask along with 2.5 g of ZSM-5 commercial FCC additive. The mixture was cracked at 420° C. for 30 minutes. The liquid recovery was 95% with the balance resolved as non-condensable gas and some condensable product. The product material was liquid at around 110° C. and is suitable to be transported from a remote facility to a centralized facility. The results showed that the liquid product boiling below 216° C. had 5.4 vol. % aromatics by using a detailed hydrocarbon analyzer GC (ASTM D6730) and the product boiling >216° C. had an aromatic carbon distribution of 0.3% in relation to 100% allocated to saturates analyzed by C13 NMR spectra. So, on an overall crude oil product basis, (which is a combination of product boiling <216° C. and product boiling >216° C.), the aromatic content is <5 wt. %. This product is a hydrogen-rich hydrocarbon product when compared to regular crude oil, but with a higher hydrogen content of (14.6 wt. %). The overall liquid yield from a combination of the first and second cracking steps is of the order of 91 wt. % of mixed polyolefin feed. Table 1 shows the potential for recovering maximum liquids through a system disclosed herein in FIG. 1.

TABLE 1

| | H, Wt. % | C, Wt. % |
|---|---|---|
| Whole regular crude oil | 12.3* | 85.1 |
| Hydrogen-rich hydrocarbons from plastics cracking | 14.6 | 85.4 |
| Regular crude oil cut boiling at <350 C. | 13.6* | 85.2 |
| Regular crude oil cut boiling at >350 C. | 11.4* | 88.6 |

*Normalized to C, H content basis

Example 2

About 50 g of the output from the extruder unit from Example 1 at 450° C. at 100 rpm (1.1 kg/hr feed rate, 5827 mol. wt.) was charged into a round bottom flask along with 2.5 g of cobalt octanoate (a representative liquid cracking catalyst from among metal naphthenates and octanoates) and the mixture was cracked at 420° C. for 30 min. The liquid recovery was about 95 wt. % (out of 52.5 g of material charged) with the balance resolved as gas (condensable and non-condensable). The product material was liquid at around 110° C. and is suitable to be transported from remote facility to a centralized facility. The material contained no aromatics. The cobalt octanoate gives satisfactory cracking performance. In an embodiment, this additive is used in the extruder unit along with plastics to accelerate the rate of depolymerization in the continuous feeding device. ZSM-5 can also be added along with plastic feed in the extruder to accelerate the rate of depolymerization in the partial depolymerization unit (extruders, twin screw reactor, auger reactor, kneader, disk ring reactor, and/or kiln). Other accelerators that can be used in the first cracking step are peroxides, oxygenates, oxygen, and other oxygen containing compounds.

Example 3

About 150 g of post-consumer mixed plastics waste containing high-density polyethylene (HDPE) at 23.2 wt. %, low-density polyethylene (LDPE) at 25.6 wt. %, linear low-density polyethylene (LLDPE) at 22 wt. %, and polypropylene (PP) at 29.2 wt. % was mixed with 7.5 g of 15% Mg on ZSM-5. The reaction was conducted in a round bottom flask at 420° C. for 60 minutes. An analysis of liquid products by detailed hydrocarbon profiling (ASTM D6730) showed a paraffin to iso-paraffin ratio of 1.7 in the liquid products. This is a primary indicator or characteristic for maximizing ethylene yield in a steam cracker. The Mg/ZSM-5 also helps in scavenging any chlorides present. The yield of liquid products was 90% of feed charged. Gas yield was ~5 wt. % and inorganics was about 5 wt. %. The liquid product is obtained as 67% light hydrocarbon cut (first hydrocarbon stream) and balance as heavy hydrocarbon cut (residual hydrocarbon stream). The boiling point distribution of these cuts are as shown in Table 2 and added together these cuts represent a hydrogen-rich hydrocarbon stream.

TABLE 2

| Mass % | Light Hydrocarbon cut boiling point, ° C. | Heavy hydrocarbon cut boiling point, ° C. |
|---|---|---|
| 0 | 36 | 233 |
| 5 | 42.8 | 328.4 |
| 10 | 63.8 | 356 |
| 30 | 151.8 | 414.8 |
| 50 | 228 | 472 |
| 70 | 285.8 | 535.6 |
| 90 | 348.4 | 642.6 |
| 95 | 371.8 | 685.8 |
| 99 | 409.8 | 731.6 |
| 100 | 422 | 740 |

Example 4

About 37 g of the cracked hydrocarbon stream from Example 3 was mixed with about 1.85 g of catalyst-rich solid. The mixture was shaken thoroughly in a separating funnel and allowed to settle. Within a minute, a solid layer was seen at the bottom of the funnel and in about three minutes, a clear solid layer was seen. In less than five minutes, the catalyst-rich solid settles down completely. This example shows clearly that catalysts can settle very rapidly and can be separated from hydrocarbon streams and can be recycled back to reactor for reuse.

Example 5

The viscosity of oligomer from Example 1 from extruder studies (450° C., 1.1 kg/hr and 100 rpm) was measured as a function of temperature in a Brookefield viscometer using No. 5 spindle. The results are as indicated in Table 3.

TABLE 3

| Temperature, ° C. | Viscosity, cP |
|---|---|
| 173 | 76 |
| 186 | 56 |
| 192 | 52 |
| 202 | 48 |
| 204 | 44 |
| 214 | 40 |
| 220 | 32 |
| 231 | 28 |
| 241 | 24 |
| 246 | 20 |
| 250 | 16 |
| 265 | 8 |
| 268 | 4 |

As per viscosity data above, viscosity at 268° C. was 4 cP. It can be expected from this trend that the viscosity at 450° C. for this molecular weight distribution of oligomers or hydrocarbons would be 1 cP or lower.

Example 6

Cracking of mixed polyolefin feed containing virgin HDPE 23.2 wt. %, LDPE 25.6 wt. %, LLDPE 22 wt. %, PP 29.2 wt. % resins was studied in a devolatilization extruder at 400° C., 1.3 Kg/hr, and 100 rpm. About 300 g of oligomer product obtained from the first cracking step was fed to a tank reactor and cracked at 420° C. for 45 min. Liquid product recovered was 91.4 wt. %. The boiling point distribution of the liquid product was as shown in Table 4. The product can be made lighter by increasing residence time or temperature in the tank reactor. In comparison, the product from plastic cracking using catalyst (Example 3) had 60% boiling at ~380° C. and 50% boiling at ~324° C.

TABLE 4

| Mass % | Product Boiling Point, ° C. |
|---|---|
| 0 | 36 |
| 5 | 125.8 |
| 10 | 174.6 |
| 30 | 381 |
| 50 | 532 |
| 70 | 623 |
| 90 | 708 |
| 95 | 727.4 |
| 99 | 744.8 |
| 100 | 747.2 |

Example 7

Post-consumer mixed plastic feed 150 g containing 90% polyolefin, 8% polystyrene, 1% PVC and 1% PET was mixed with 7.5 g of catalyst (80 wt. % spent FCC catalyst and 20 wt. % of 15% Mg-ZSM-5 catalyst) and cracked in a flask at 420° C. for 1 hr. The liquid product yield was 89.2 wt. %, the gas yield was 5.6 wt. % and inorganics residue was 5.2 wt. %. The liquid product was obtained as 72% light hydrocarbon cut (first hydrocarbon stream) with the balance as heavy hydrocarbon cut (residual hydrocarbon stream). The boiling point distribution of these cuts are shown in Table 5 and added together these cuts represent a hydrogen-rich hydrocarbon stream.

TABLE 5

| Mass % | Light Hydrocarbon cut boiling point, ° C. | Heavy hydrocarbon cut boiling point, ° C. |
|---|---|---|
| 0 | 36 | 207.4 |
| 5 | 36 | 296.6 |
| 10 | 87 | 328.6 |
| 30 | 132.2 | 390.2 |
| 50 | 183.6 | 431.8 |
| 70 | 249.6 | 480.8 |
| 90 | 322.6 | 569 |
| 95 | 353.8 | 622.2 |
| 99 | 418.8 | 708.4 |
| 100 | 465.6 | 726 |

Example 8

Post-consumer mixed plastic feed 150 g containing 90% polyolefin, 8% polystyrene, 1% PVC and 1% PET was mixed with 7.5 g of catalyst (80 wt. % spent FCC catalyst and 20 wt. % of 15% Mg-ZSM-5 catalyst) and cracked in a flask at 420° C. for 2.5 hrs. The liquid product yield was 87.7 wt. %, gas yield was 7 wt. %, and inorganics residue was 5.3 wt. %.

Example 9

Products of melt cracking of mixed plastic waste streams subjected to various FCC operating conditions and combinations hydrocarbon processing units are presented in Table 6.

TABLE 6

| Component | High Severity FCC Operating Conditions, % | Steam Cracking of High Severity FCC Operating Conditions Naphtha Saturates and Gas Feedstream, % | Total High Value Chemicals Yield from FCC plus Steam Cracking, % |
|---|---|---|---|
| Ethylene | 8.1 | 5.3 | 13.4 |
| Propylene | 23.6 | 8.4 | 32 |
| C4 Olefins | 11.2 | 4.3 | 15.5 |
| BTX | 9.4 | 3.0 | 12.4 |
| Crackable Carbons | 29.3 | | |
| High Value Chemicals | 52.3 | 21 | 73.3 |

Example 10

A neat resin mixture containing 90 wt. % polyolefins, 8 wt. % Polystyrene, 1 wt. % PET and 1 wt. % PVC was processed at 1.7 kg/hr feed rate at 140 mmHg pressure absolute in a devolatilization extruder with an imposed temperature profile, starting from the feed section to the extruder exit at 450° C. Molten oligomer produced had 47 ppmw chlorides.

Other objects, features and advantages of the disclosure will become apparent from the foregoing figures, detailed description, and examples. It should be understood, however, that the figures, detailed description, and examples, while indicating specific embodiments of the disclosure, are given by way of illustration only and are not meant to be limiting. Additionally, it is contemplated that changes and modifications within the spirit and scope of the disclosure will become apparent to those skilled in the art from the detailed description. In further embodiments, features from specific embodiments may be combined with features from other embodiments. For example, features from one embodiment may be combined with features from any of the other embodiments. In further embodiments, additional features may be added to the specific embodiments described herein.

What is claimed is:

1. A method of processing a mixed plastic waste feed to produce a high value chemical (HVC) product, the method comprising:

introducing a mixed plastic waste feed containing a plurality of plastic polymers to a depolymerization unit;

operating the depolymerization unit at a temperature and a residence time sufficient to at least partially depolymerize the plurality of plastic polymers in the mixed plastic waste feed to produce a hydrogen-rich molten oligomers product stream containing inorganic products from the mixed plastic waste feed and a gas stream containing volatile hydrocarbons and heteroatoms; and supplying the hydrogen-rich molten oligomers product stream and a hydrogen-lean hydrocarbon stream to a hydrocarbon processing unit operated at a temperature ranging from about 400° C. to about 750° C. to produce a HVC product, the hydrogen-lean hydrocarbon stream being one or more of an atmospheric residue, a vacuum residue, a straight run vacuum gas oil, or a cracked vacuum gas oil.

2. The method of claim 1, wherein the depolymerization unit is operated at a temperature ranging from about 250° C. to about 500° C. and a residence time of less than 1 hour.

3. The method of claim 1, wherein average molecular weight of the hydrogen-rich molten oligomers product stream is at least twenty times lower than average molecular weight of the mixed plastic waste feed, and wherein the hydrogen-rich molten oligomers product stream contains less than 10 wt. percent additional aromatics present in the mixed plastic waste feed.

4. The method of claim 1, further comprising:

passing the hydrogen-rich molten oligomers product stream to a melt filtration unit, a slurry settling unit, or a centrifugation unit to remove a portion of the inorganic products and insoluble components in the hydrogen-rich molten oligomers product stream before supplying the hydrogen-rich molten oligomer product to the hydrocarbon processing unit.

5. The method of claim 1, further comprising:

collecting the hydrogen-rich molten oligomers product stream in a holding tank to remove heteroatoms present as volatiles in the hydrogen-rich molten oligomers product stream before supplying the hydrogen-rich molten oligomers product to the hydrocarbon processing unit.

6. The method of claim 5, further comprising:

passing a stripping gas stream through the hydrogen-rich molten oligomers product stream in the holding tank to further remove heteroatoms present as volatiles in the hydrogen-rich molten oligomers product stream before supplying the hydrogen-rich molten oligomers product to the hydrocarbon processing unit.

7. The method of claim 1, further comprising:

passing the hydrogen-rich molten oligomers product stream to a separation unit to remove a portion of chlorine compounds, nitrogen compounds, and sulfur compounds before supplying the hydrogen-rich molten oligomers product to the hydrocarbon processing unit.

8. A method of processing a mixed plastic waste feed to produce a high value chemical (HVC) product, the method comprising:

introducing a mixed plastic waste feed containing a plurality of plastic polymers to a depolymerization unit;

operating the depolymerization unit at a temperature and a residence time sufficient to at least partially depolymerize the plurality of plastic polymers in the mixed plastic waste feed to produce a hydrogen-rich molten oligomers product stream containing inorganic products and a gas stream containing volatile hydrocarbons and heteroatoms;

supplying the hydrogen-rich molten oligomers product stream and a hydrogen stream to a first cracking unit containing a cracking catalyst to produce a first hydrocarbonaceous stream and a first slurry stream, the first cracking unit being a continuous cracking unit and the first slurry stream containing a portion of the cracking catalyst, the inorganic products, and residual hydrocarbons;

passing the first slurry stream from the first cracking unit to a first separation unit to produce a second slurry stream containing the inorganic products and the residual hydrocarbons and a catalyst-rich stream containing the portion of the cracking catalyst;

supplying the catalyst-rich stream to the first cracking unit;

introducing the second slurry stream to a second separation unit to produce a second hydrocarbonaceous stream containing the residual hydrocarbons and an inorganic products-rich stream;

delivering the first hydrocarbonaceous stream and the second hydrocarbonaceous stream to a distillation unit to produce a distillate stream and a bottoms stream containing residual hydrocarbons, metals, and residual inorganic products;

processing the bottoms stream in a third separation unit to remove the metals and the residual inorganic products and to produce a recovered hydrocarbon stream;

mixing the recovered hydrocarbon stream and the distillate stream to produce a hydrogen-rich liquid hydrocarbon stream; and supplying the hydrogen-rich liquid hydrocarbon stream and a hydrogen-lean hydrocarbon stream to a second cracking unit operated at a temperature ranging from about 400° C. to about 750° C. to produce a HVC product, the hydrogen-lean hydrocarbon stream being one or more of an atmospheric residue, a vacuum residue, a straight run vacuum gas oil, or a cracked vacuum gas oil.

9. The method of claim 8, wherein the hydrogen-rich liquid hydrocarbon stream and the hydrogen-lean hydrocarbon stream are mixed prior being supplied to the second cracking unit.

10. The method of claim 8, further comprising:

passing the hydrogen-rich molten oligomers product stream to a melt filtration unit, a slurry settling unit, or a centrifugation unit to remove a portion of the inorganic products and insoluble components before supplying the hydrogen-rich molten oligomers product to the first cracking unit.

11. The method of claim 8, further comprising:

collecting the hydrogen-rich molten oligomers product stream in a holding tank to remove heteroatoms as volatiles before supplying the hydrogen-rich molten oligomers product to the first cracking unit.

12. The method of claim 8, further comprising:

passing the hydrogen-rich molten oligomers product stream to a separation unit to remove a portion of chlorine compounds, nitrogen compounds, and sulfur compounds before supplying the hydrogen-rich molten oligomers product to the first cracking unit.

13. A method of processing a mixed plastic waste feed to produce a high value chemical (HVC) product, the method comprising:

introducing a mixed plastic waste feed containing a plurality of plastic polymers to a depolymerization unit;

operating the depolymerization unit at a temperature and a residence time sufficient to at least partially depolymerize the plurality of plastic polymers in the mixed plastic waste feed to produce a hydrogen-rich molten oligomers product stream containing inorganic products from the mixed plastic waste feed and a gas stream containing volatile hydrocarbons and heteroatoms;

supplying the hydrogen-rich molten oligomers product stream and a hydrogen stream to a thermal hydrotreating unit to produce a first hydrocarbonaceous stream and a slurry stream containing the inorganic products and residual hydrocarbons;

passing the first slurry stream from the thermal hydrotreating unit to a first separation unit to produce an inorganic products-rich stream and a second hydrocarbonaceous stream containing the residual hydrocarbons;

delivering the first hydrocarbonaceous stream and the second hydrocarbonaceous stream to a distillation unit to produce a distillate stream and a bottoms stream containing the residual hydrocarbons, metals, and residual inorganic products;

processing the bottoms stream in a second separation unit to remove the metals and the residual inorganic products and to produce a recovered hydrocarbon stream;

mixing the recovered hydrocarbon stream and the distillate stream to produce a hydrogen-rich liquid hydrocarbon stream; and supplying the hydrogen-rich liquid hydrocarbon stream and a hydrogen-lean hydrocarbon stream to a fluid catalytic cracking unit operated at a temperature ranging from about 400° C. to about 750° C. to produce a HVC product, the hydrogen-lean hydrocarbon stream being one or more of an atmospheric residue, a vacuum residue, a straight run vacuum gas oil, or a cracked vacuum gas oil.

14. The method of claim 13, wherein the hydrogen-rich liquid hydrocarbon stream and the hydrogen-lean hydrocarbon stream are mixed prior being supplied to the fluid catalytic cracking unit.

15. The method of claim 13, wherein the hydrogen-rich liquid hydrocarbon stream and the hydrogen-lean hydrocarbon stream are separately supplied to the fluid catalytic cracking unit.

16. The method of claim 13, wherein average molecular weight of the hydrogen-rich molten oligomers product stream is at least twenty times lower than average molecular weight of the mixed plastic waste feed.

17. The method of claim 13, further comprising:

passing the hydrogen-rich molten oligomers product stream to a melt filtration unit, a slurry settling unit, or a centrifugation unit to remove a portion of the inorganic products and insoluble components before supplying the hydrogen-rich molten oligomers product to the thermal hydrotreating unit.

18. The method of claim 13, further comprising:

collecting the hydrogen-rich molten oligomers product stream in a holding tank to remove heteroatoms present as volatiles in the hydrogen-rich molten oligomers product stream before supplying the hydrogen-rich molten oligomers product to the thermal hydrotreating unit.

19. The method of claim 13, further comprising:

passing a stripping gas stream through the hydrogen-rich molten oligomers product stream collected in a holding tank to remove heteroatoms present as volatiles in the hydrogen-rich molten oligomers product stream before supplying the hydrogen-rich molten oligomers product to the thermal hydrotreating unit.

20. The method of claim 13, wherein the first separation unit is a coking unit to remove residual metals and the inorganic products in the form of coke.

* * * * *